United States Patent [19]
Furuya et al.

[11] Patent Number: 5,606,571
[45] Date of Patent: Feb. 25, 1997

[54] MICROWAVE POWERED GAS LASER APPARATUS

[75] Inventors: Nobuaki Furuya; Makoto Kato, both of Kawasaki; Koichi Saito, Yokohama; Minoru Kimura, Zama; Kimikatsu Sato, Sagamihara, all of Japan

[73] Assignee: Matsushita Electric Industrial Co., Ltd., Osaka, Japan

[21] Appl. No.: 407,158

[22] Filed: Mar. 20, 1995

[30] Foreign Application Priority Data

| Mar. 23, 1994 | [JP] | Japan | 6-051799 |
| Dec. 12, 1994 | [JP] | Japan | 6-307409 |
| Jan. 24, 1995 | [JP] | Japan | 7-009083 |
| Feb. 17, 1995 | [JP] | Japan | 7-029415 |

[51] Int. Cl.[6] .................................. H01S 3/97
[52] U.S. Cl. .................. 372/82; 372/92; 372/64
[58] Field of Search ................... 372/81, 82, 64, 372/45, 92; 315/39; 328/59; 417/322; 62/6

[56] References Cited

U.S. PATENT DOCUMENTS

| 4,177,404 | 12/1979 | Eguchi . | |
| 4,227,153 | 10/1980 | Birx | 328/59 |
| 4,323,746 | 4/1982 | Gerling . | |
| 4,361,744 | 11/1982 | Mercier et al. . | |
| 4,479,915 | 6/1988 | Lynch et al. . | |
| 4,802,183 | 1/1989 | Harris et al. | 372/82 |
| 4,817,102 | 3/1989 | Maurer et al. | 372/45 |
| 4,890,294 | 12/1989 | Nishimae et al. | 372/82 |
| 4,954,755 | 9/1990 | Lynch et al. . | |
| 4,987,577 | 1/1991 | Seunik et al. | 372/82 |
| 5,020,977 | 6/1991 | Lucas | 417/322 |
| 5,148,129 | 9/1992 | Bolton | 315/39 |
| 5,167,124 | 12/1992 | Luicas | 62/6 |
| 5,188,862 | 2/1993 | Itatani et al. . | |
| 5,357,757 | 10/1994 | Lucas | 62/9 |
| 5,379,317 | 1/1995 | Bridges et al. | 372/82 |
| 5,412,684 | 5/1995 | Schlie et al. | 372/82 |

FOREIGN PATENT DOCUMENTS

| 0280044 | 1/1988 | European Pat. Off. . |
| 0297343 | 3/1988 | European Pat. Off. . |
| 3626922A1 | 8/1986 | Germany . |
| 3743258A1 | 12/1987 | Germany . |
| 63-250095 | 10/1988 | Japan . |
| 2-78285 | 3/1990 | Japan . |
| 2130975 | 5/1990 | Japan . |

*Primary Examiner*—Leon Scott Jr.
*Attorney, Agent, or Firm*—Lowe, Price, LeBlanc & Becker

[57] ABSTRACT

A microwave powered gas laser apparatus contains a gas medium, and a device for exciting the gas medium to a high energy state by a plurality of microwaves. Directions of vibrations of electric fields of the microwaves are different from each other. There may be provided a device for making the microwaves into standing waves respectively, and a device for exposing the gas medium to antinodes of electric fields of the standing waves.

63 Claims, 19 Drawing Sheets

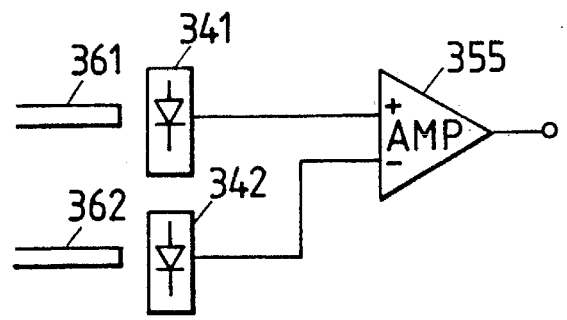
FIG. 21
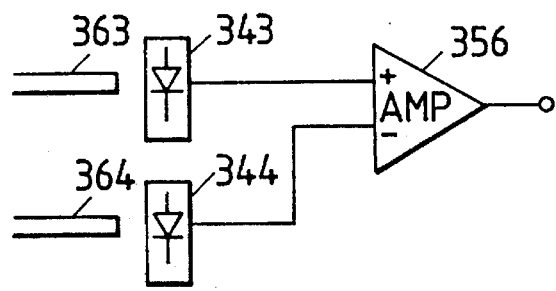
FIG. 22
FIG. 23
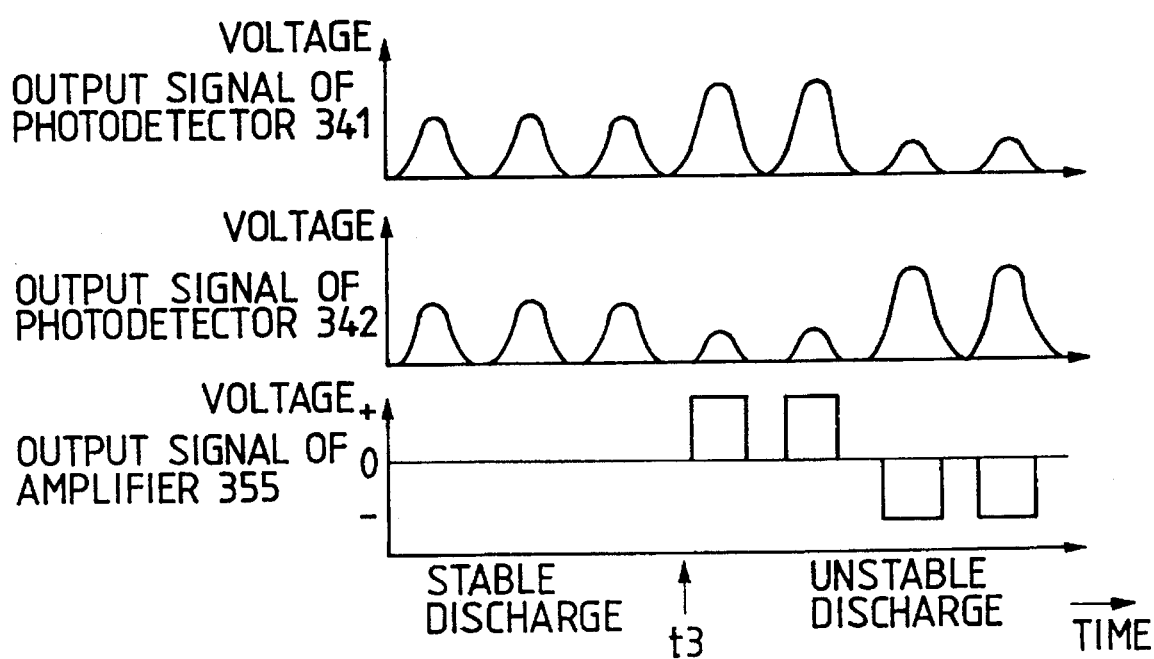

MICROWAVE POWERED GAS LASER APPARATUS

BACKGROUND OF THE INVENTION

1. Field of the Invention

This invention relates to a microwave powered gas laser apparatus.

2. Description of the Prior Art

In microwave powered gas laser apparatus, molecules of laser medium gas are excited to high energy states by microwave through a discharge process to provide laser oscillation. To attain a high efficiency of the laser oscillation, it is desirable to provide spatially even excitation of the laser medium gas by the microwave for the following reason. Uneven excitation tends to cause streamer discharge, extraordinarily heating of the gas in local areas, and a spatial unevenness in the laser amplification factor which result in a drop in the laser oscillation efficiency and a decrease in the maximum laser power output. It should be noted that the streamer discharge is unsuited to desired excitation.

In the excitation by the microwave through the discharge process, since the wavelength of the microwave is ten centimeters or more, it tends to be difficult to provide an even distribution of the strength (the intensity) of an electric field over a wide spatial region. The uneven distribution of the strength of the electric field results in spatially uneven discharge.

Japanese published unexamined patent application 2-130975 discloses that an insulator disposed within a waveguide for microwave restricts a glow discharge area to improve the degree of spatial evenness of the electric field of the microwave.

SUMMARY OF THE INVENTION

It is an object of this invention to provide an improved microwave powered gas laser apparatus.

A first aspect of this invention provides a microwave powered gas laser apparatus comprising a gas medium; and means for exciting the gas medium to a high energy state by a plurality of microwaves; wherein directions of vibrations of electric fields of the microwaves are different from each other.

A second aspect of this invention is based on the first aspect of this invention, and provides a microwave powered gas laser apparatus further comprising means for making the microwaves into standing waves respectively, and means for exposing the gas medium to antinodes of electric fields of the standing waves.

A third aspect of this invention is based on the first aspect of this invention, and provides a microwave powered gas laser apparatus wherein the microwaves comprise pulse microwaves.

A fourth aspect of this invention is based on the third aspect of this invention, and provides a microwave powered gas laser apparatus wherein the pulse microwaves have a frequency of 20 kHz or higher.

A fifth aspect of this invention is based on the third aspect of this invention, and provides a microwave powered gas laser apparatus wherein the gas medium emits pulse laser light.

A sixth aspect of this invention is based on the third aspect of this invention, and provides a microwave powered gas laser apparatus comprising means for synchronizing the pulse microwaves.

A seventh aspect of this invention is based on the third aspect of this invention, and provides a microwave powered gas laser apparatus wherein the pulse microwaves have a duty cycle in a range of 0.1 to 0.3.

An eighth aspect of this invention is based on the third aspect of this invention, and provides a microwave powered gas laser apparatus further comprising means for synchronizing leading edges of the pulse microwaves.

A ninth aspect of this invention is based on the first aspect of this invention, and provides a microwave powered gas laser apparatus wherein the directions of vibrations of the electric fields of the microwaves are perpendicular to each other.

A tenth aspect of this invention is based on the ninth aspect of this invention, and provides a microwave powered gas laser apparatus further comprising a laser tube containing the gas medium, and wherein at least one of the directions of vibrations of the electric fields of the microwaves is perpendicular to an optical axis of the laser tube.

An eleventh aspect of this invention is based on the second aspect of this invention, and provides a microwave powered gas laser apparatus wherein the means for making the microwaves into the standing waves comprises a resonant cavity, the resonant cavity comprising waveguides intersecting with each other at an intersection place, the gas medium being positioned in the intersection place.

A twelfth aspect of this invention is based on the eleventh aspect of this invention, and provides a microwave powered gas laser apparatus wherein the waveguides intersect with each other at a right angle.

A thirteenth aspect of this invention is based on the twelfth aspect of this invention, and provides a microwave powered gas laser apparatus further comprising microwave generators radiating the microwaves into the waveguides respectively.

A fourteenth aspect of this invention is based on the eleventh aspect of this invention, and provides a microwave powered gas laser apparatus wherein the waveguides are provided with matching devices respectively.

A fifteenth aspect of this invention is based on the first aspect of this invention, and provides a microwave powered gas laser apparatus further comprising a single microwave generator producing original microwave, and means for deriving the microwaves from the original microwave.

A sixteenth aspect of this invention is based on the second aspect of this invention, and provides a microwave powered gas laser apparatus wherein the means for making the microwaves into the standing waves comprises a resonant cavity, the resonant cavity comprising waveguides intersecting with each other at an intersection place, the gas medium being positioned in the intersection place, and further comprising a single microwave generator producing original microwave, and means for deriving the microwaves from the original microwave.

A seventeenth aspect of this invention is based on the fifteenth aspect of this invention, and provides a microwave powered gas laser apparatus wherein the means for deriving the microwaves from the original microwave comprises means for dividing the original microwave into the microwaves.

An eighteenth aspect of this invention is based on the first aspect of this invention, and provides a microwave powered gas laser apparatus further comprising a single microwave generator producing original microwave, a microwave divider separating the original microwave into microwaves, and waveguides transmitting the microwaves from the microwave divider to the gas medium.

A nineteenth aspect of this invention is based on the eighteenth aspect of this invention, and provides a microwave powered gas laser apparatus wherein the waveguides are provided with matching devices respectively.

A twentieth aspect of this invention is based on the fifteenth aspect of this invention, and provides a microwave powered gas laser apparatus further comprising means for circulating the microwaves in a loop path and applying the microwaves to the gas medium.

A twenty-first aspect of this invention is based on the sixteenth aspect of this invention, and provides a microwave powered gas laser apparatus wherein the waveguides are provided with matching devices respectively.

A twenty-second aspect of this Invention is based on the eleventh aspect of this Invention, and provides a microwave powered gas laser apparatus wherein the resonant cavity has a rectangular parallelepiped shape.

A twenty-third aspect of this invention is based on the twenty-second aspect of this Invention, and provides a microwave powered gas laser apparatus further comprising microwave generators producing the microwaves and being provided on adjacent surfaces of the resonant cavity respectively.

A twenty-fourth aspect of this Invention is based on the twenty-third aspect of this invention, and provides a microwave powered gas laser apparatus further comprising matching devices provided on adjacent surfaces of the resonant cavity respectively.

A twenty-fifth aspect of this Invention is based on the eleventh aspect of this invention, and provides a microwave powered gas laser apparatus wherein the resonant cavity has a cylindrical shape.

A twenty-sixth aspect of this invention is based on the twenty-fifth aspect of this invention, and provides a microwave powered gas laser apparatus further comprising microwave generators producing the microwaves and being provided on the resonant cavity.

A twenty-seventh aspect of this invention is based on the twenty-sixth aspect of this invention, and provides a microwave powered gas laser apparatus further comprising matching devices provided on the resonant cavity.

A twenty-eighth aspect of this invention is based on the twenty-third aspect of this invention, and provides a microwave powered gas laser apparatus further comprising a laser tube containing the gas medium, and antennas provided on the microwave generators respectively and being located in the resonant cavity.

A twenty-ninth aspect of this invention is based on the first aspect of this invention, and provides a microwave powered gas laser apparatus wherein frequencies of the microwaves are different from each other.

A thirtieth aspect of this invention is based on the twenty-ninth aspect of this invention, and provides a microwave powered gas laser apparatus wherein a difference between the frequencies of the microwaves is equal to 0.1 GHz or less.

A thirty-first aspect of this invention is based on the fifteenth aspect of this invention, and provides a microwave powered gas laser apparatus wherein frequencies of the microwaves are equal to each other, and a temporal phase difference between the microwaves is in a range of 90 degrees ±4.5 degrees.

A thirty-second aspect of this invention is based on the thirty-first aspect of this invention, and provides a microwave powered gas laser apparatus wherein a difference between distances of propagation of the microwaves from the microwave generator to the gas medium is equal to a wavelength of the microwaves which is multiplied by a value of (¼+N/2), where N denotes an integer equal to or greater than 0.

A thirty-third aspect of this invention is based on the thirty-second aspect of this invention, and provides a microwave powered gas laser apparatus wherein the difference between the distances of propagation of the microwaves from the microwave generator to the gas medium is in a range of ±5% around the value of (¼+N/2).

A thirty-fourth aspect of this invention is based on the thirty-first aspect of this invention, and provides a microwave powered gas laser apparatus further comprising a phase shifter provided in one of paths of propagation of the microwaves from the microwave generator to the gas medium.

A thirty-fifth aspect of this invention is based on the first aspect of this invention, and provides a microwave powered gas laser apparatus further comprising means for adjusting conditions of standing waves of the microwaves.

A thirty-sixth aspect of this invention is based on the thirty-fifth aspect of this invention, and provides a microwave powered gas laser apparatus where in the means for adjusting the conditions of the standing waves of the microwaves comprises plungers having apertures.

A thirty-seventh aspect of this invention is based on the first aspect of this invention, and provides a microwave powered gas laser apparatus wherein the microwaves have frequencies in a range of 2.45 GHz ±0.05 GHz.

A thirty-eighth aspect of this invention is based on the first aspect of this invention, and provides a microwave powered gas laser apparatus further comprising magnetrons producing the microwaves respectively, means for feeding currents to the magnetrons respectively, and means for compensating a difference between the currents.

A thirty-ninth aspect of this invention is based on the thirty-eighth aspect of this invention, and provides a microwave powered gas laser apparatus wherein the means for compensating the difference between the currents comprises windings which generate magnetic fields canceling each other, and means for enabling the currents to flow through the windings respectively.

A fortieth aspect of this invention is based on the thirty-eighth aspect of this invention, and provides a microwave powered gas laser apparatus further comprising a core providing with the windings.

A forty-first aspect of this invention is based on the first aspect of this invention, and provides a microwave powered gas laser apparatus further comprising means for detecting light beams emitted from regions in the gas medium respectively to monitor discharge conditions of the gas medium.

A forty-second aspect of this invention is based on the forty-first aspect of this invention, and provides a microwave powered gas laser apparatus wherein the means for detecting the light beams comprises photodetectors subjected to the light beams respectively, comparators comparing output signals of the photodetectors with predetermined reference signals, and means for combining output signals of the comparators into a composite signal representing the discharge conditions of the gas medium.

A forty-third aspect of this invention is based on the forty-first aspect of this invention, and provides a microwave powered gas laser apparatus wherein the means for detecting the light beams comprises photodetectors subjected to the light beams respectively, and means for generating a difference signal which depends on a difference between output signals of the photodetectors, the difference signal representing the discharge conditions of the gas medium.

A forty-fourth aspect of this invention is based on the forty-first aspect of this invention, and provides a microwave powered gas laser apparatus further comprising a cylindrical laser tube containing the gas medium, and wherein the regions are separated from each other in at least one of a diametrical direction and an axial direction with respect to the cylindrical laser tube.

A forty-fifth aspect of this invention is based on the forty-fourth aspect of this invention, and provides a microwave powered gas laser apparatus wherein the means for detecting the light beams comprises photodetectors subjected to the light beams respectively, the photodetectors including photodiodes provided in a single unit.

A forty-sixth aspect of this invention is based on the forty-first aspect of this invention, and provides a microwave powered gas laser apparatus further comprising means for detecting arc conditions of the gas medium in response to the detected light beams.

A forty-seventh aspect of this invention is based on the forty-first aspect of this invention, and provides a microwave powered gas laser apparatus wherein the means for detecting the light beams comprises photodetectors, and optical transmission lines guiding the light beams to the photodetectors respectively.

A forty-eighth aspect of this invention is based on the forty-seventh aspect of this invention, and provides a microwave powered gas laser apparatus further comprising a cylindrical laser tube containing the gas medium, and wherein ends of the optical transmission lines closer to the gas medium are spaced from each other in a diametrical direction with respect to the cylindrical laser tube.

A forty-ninth aspect of this invention is based on the forty-seventh aspect of this invention, and provides a microwave powered gas laser apparatus further comprising a cylindrical laser tube containing the gas medium, and wherein ends of the optical transmission lines closer to the gas medium are spaced from each other in an axial direction with respect to the cylindrical laser tube.

A fiftieth aspect of this invention is based on the forty-second aspect of this invention, and provides a microwave powered gas laser apparatus wherein the predetermined reference signals correspond to a boundary between a stable discharge condition and an unstable discharge condition.

A fifty-first aspect of this invention is based on the forty-seventh aspect of this invention, and provides a microwave powered gas laser apparatus wherein the optical transmission lines comprise a projection lens.

A fifty-second aspect of this invention is based on the forty-seventh aspect of this invention, and provides a microwave powered gas laser apparatus wherein the optical transmission lines comprise optical fiber cables.

A fifty-third aspect of this invention is based on the first aspect of this invention, and provides a microwave powered gas laser apparatus further comprising means for controlling a distribution of intensity of the electric field of at least one of the microwaves.

A fifty-fourth aspect of this invention is based on the fifty-third aspect of this invention, and provides a microwave powered gas laser apparatus further comprising a laser tube containing the gas medium, and means for driving the gas medium to flow through the laser tube, and wherein a rate of a variation in the intensity of the electric field in a downstream portion of the laser tube is greater than a rate of a variation in the intensity of the electric field in an upstream portion of the laser tube.

A fifty-fifth aspect of this invention is based on the fifty-third aspect of this invention, and provides a microwave powered gas laser apparatus further comprising a laser tube containing the gas medium, and means for driving the gas medium to flow through the laser tube, and wherein a peak of the intensity of the electric field is located in a downstream half of the laser tube.

A fifty-sixth aspect of this Invention is based on the fifty-third aspect of this invention, and provides a microwave powered gas laser apparatus wherein the means for controlling the distribution comprises an electrically conductive member.

A fifty-seventh aspect of this invention is based on the fifty-third aspect of this invention, and provides a microwave powered gas laser apparatus wherein the means for controlling the distribution comprises a plurality of electrically conductive members, and means for substantially equalizing potentials at the electrically conductive members.

A fifty-eighth aspect of this invention is based on the fifty-third aspect of this invention, and provides a microwave powered gas laser apparatus wherein the means for controlling the distribution comprises means for cutting off a portion of the electric field in the gas medium.

A fifty-ninth aspect of this invention is based on the fifty-eighth aspect of this invention, and provides a microwave powered gas laser apparatus further comprising a laser tube containing the gas medium, and wherein the means for controlling the distribution comprises an electrical conductive member surrounding a part of the laser tube.

A sixtieth aspect of this invention is based on the fifty-third aspect of this invention, and provides a microwave powered gas laser apparatus further comprising a laser tube containing the gas medium, waveguides transmitting the microwaves to the gas medium and intersecting with each other at an intersection place containing the laser tube, and wherein the means for controlling the distribution comprises means for controlling a distribution of intensity of the electric field of at least one of the microwaves along a radial direction with respect to the laser tube.

A sixty-first aspect of this invention is based on the sixtieth aspect of this invention, and provides a microwave powered gas laser apparatus wherein the means for controlling the distribution comprises an electrically conductive member.

A sixty-second aspect of this invention is based on the sixty-first aspect of this invention, and provides a microwave powered gas laser apparatus wherein the means for controlling the distribution comprises a plurality of electrically conductive members, and means for substantially equalizing potentials at the electrically conductive members.

A sixty-third aspect of this invention is based on the first aspect of this invention, and provides a microwave powered gas laser apparatus wherein the gas medium comprises $CO_2$ gas.

BRIEF DESCRIPTION OF THE DRAWINGS

FIG. 21 is a diagram of a part of a microwave powered gas laser apparatus according to a ninth embodiment of this invention.

FIG. 22 is a diagram of another part of the apparatus according to the ninth embodiment.

FIG. 23 is a time-domain diagram of signals in the apparatus of FIG. 21.

DESCRIPTION OF THE PREFERRED EMBODIMENTS

First Embodiment

Figure 1:
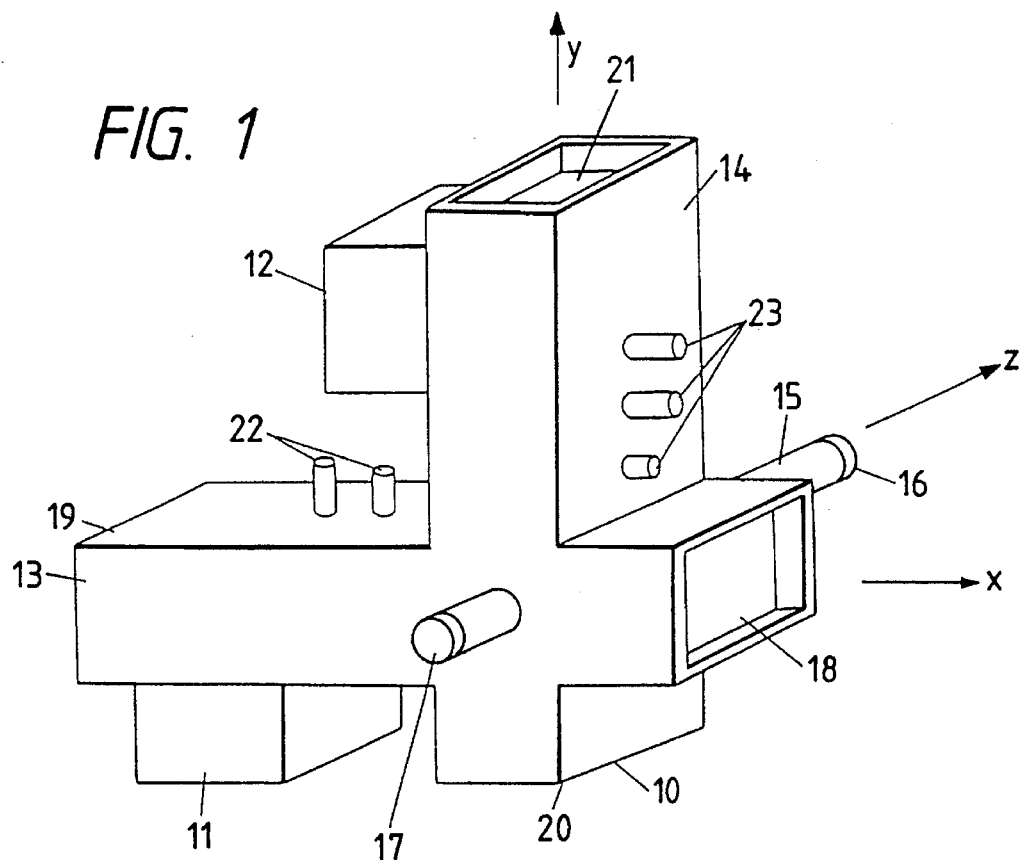
FIG. 1 is a perspective view of a microwave powered gas laser apparatus according to a first embodiment of this invention.
Figure 2:
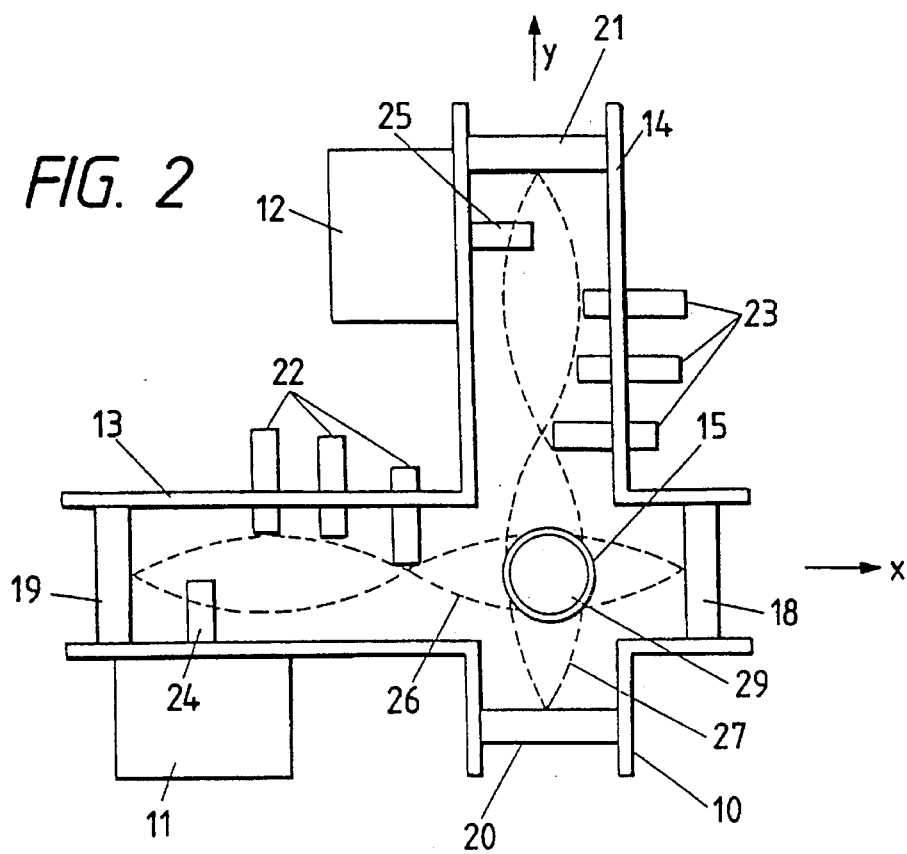
FIG. 2 is a sectional view of the microwave powered gas laser apparatus in FIG. 1.

With reference to FIGS. 1 and 2, a microwave powered gas laser apparatus includes a resonant cavity 10 formed by two waveguides 13 and 14 intersecting with each other.

A microwave generator 11 having an antenna 24 is connected and coupled to the waveguide 13. The antenna 24 is located in the waveguide 13. The microwave generator 11 produces microwave of a given frequency which is radiated into the resonant cavity 10 via the antenna 24. A microwave generator 12 having an antenna 25 is connected and coupled to the waveguide 14. The antenna 25 is located in the waveguide 14. The microwave generator 12 produces microwave of a given frequency which is radiated into the resonant cavity 10 via the antenna 25.

A laser tube 15 filled with laser medium gas 29 extends through a region of the resonant cavity 10 at which the waveguides 13 and 14 meet. An output mirror 16 is located at one end of the laser tube 15. A total reflection mirror 17 is located at the other end of the laser tube 15. The output mirror 16 and the total reflection mirror 17 compose an optical resonator.

Plungers 18, 19, 20, and 21 are movably disposed in ends of the waveguides 13 and 14. The waveguide 13 is provided with a matching device 22 having three stub tuners. The waveguide 14 is provided with a matching device 23 having three stub tuners.

The longitudinal axis of the waveguide 13, the longitudinal axis of the waveguide 14, and the longitudinal axis (the optical axis) of the laser tube 15 are perpendicular to each other. An orthogonal coordinate system is introduced in which an "x" direction (an x-axis direction), a "y" direction (a y-axis direction), and a "z" direction (a z-axis direction) are defined as corresponding to the longitudinal axis of the waveguide 13, the longitudinal axis of the waveguide 14, and the longitudinal axis (the optical axis) of the laser tube 15 respectively.

In FIG. 2, the numeral 26 denotes a distribution of the strength (the intensity) of a y-direction electric field of the microwave produced by the microwave generator 11. In addition, the numeral 27 denotes a distribution of the strength (the intensity) of an x-direction electric field of the microwave produced by the microwave generator 12. It is preferable that, in the position of the laser tube 15, the direction of the electric field of the microwave produced by the microwave generator 11, the direction of the electric filed of the microwave produced by the microwave generator 12, and the direction of the optical axis of the laser tube 15 are perpendicular to each other.

Figure 3:
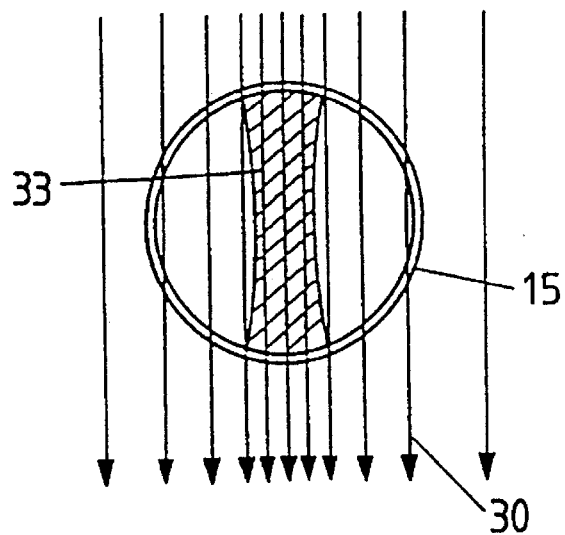
FIG. 3 is a sectional diagram of a laser tube and lines of electric flux.

FIG. 3 shows an example of discharge conditions within the laser tube 15 which occur when only the y-direction electric field is applied to the laser tube 15. In FIG. 3, the numeral 30 denotes lines of y-direction electric flux, and the numeral 33 denotes a region within the laser tube 15 in which discharge occurs.

Figure 4:
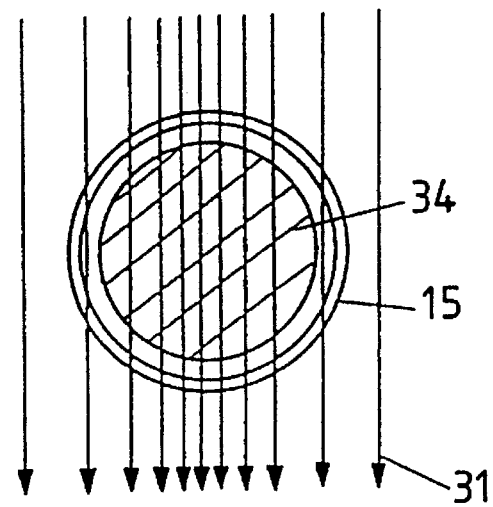
FIG. 4 is a sectional diagram of the laser tube and lines of electric flux.
Figure 5:
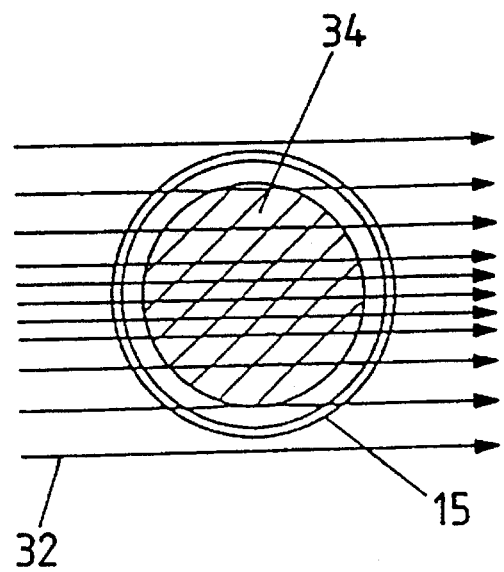
FIG. 5 is a sectional diagram of the laser tube and lines of electric flux.

FIGS. 4 and 5 show examples of discharge conditions within the laser tube 15 which occur when both the x-direction electric field and the y-direction electric field are applied to the laser tube 15. FIG. 4 shows a phase of the discharge conditions which occurs when the direction of a resultant electric field moves into agreement with the "y" direction. In FIG. 4, the numeral 31 denotes lines of y-direction electric flux, and the numeral 34 denotes a region within the laser tube 15 in which discharge occurs. FIG. 5 shows a phase of the discharge conditions which occurs when the direction of the resultant electric field moves into agreement with the "x" direction. In FIG. 5, the numeral 32 denotes lines of x-direction electric flux, and the numeral 34 denotes a region within the laser tube 15 in which discharge occurs.

The microwave powered gas laser apparatus is directed to, for example, a $CO_2$ gas laser apparatus. The microwave powered gas laser apparatus may be directed to another gas laser apparatus such as a CO gas laser apparatus, an $N_2$ gas laser apparatus, a metal vapor gas laser apparatus, a rare gas laser apparatus, an He-Ne gas laser apparatus, an ion gas laser apparatus, or a halogen gas laser apparatus.

With reference back to FIGS. 1 and 2, the microwave produced by the microwave generator 11 and the microwave produced by the microwave generator 12 have a frequency in the range of 2.45 GHz ±0.05 GHz. The microwave produced by the microwave generator 11 is propagated in the waveguide 13, and is subjected to a matching process by the matching device 22. The microwave produced by the microwave generator 12 is propagated in the waveguide 14, and is subjected to a matching process by the matching device 23.

The waveguides 13 and 14 intersect with each other in a region containing the laser tube 15. The waveguides 13 and 14 meet at a right angle. In the position of the laser tube 15, the direction of travel of the microwave produced by the microwave generator 11 is perpendicular to the direction of travel of the microwave produced by the microwave generator 12. Furthermore, the direction of a variation in the electric field of the microwave produced by the microwave generator 11 is perpendicular to the direction of a variation in the electric field of the microwave produced by the microwave generator 12. In other words, the direction of an electric field vector of the microwave produced by the microwave generator 11 is perpendicular to the direction of an electric field vector of the microwave produced by the microwave generator 12.

The laser medium gas 29 includes, for example, a mixture of $CO_2$ gas, $N_2$ gas, and He gas with a rate of 1:9:40 or 4:24:72. The laser medium gas 29 has a pressure of about 60 Torr. The laser medium gas 29 is excited by the perpendicular microwave electric fields through a discharge process so that the laser tube 15 is activated and laser light is emitted from the optical resonator in the "z" direction. It should be noted that the optical resonator is composed of the output mirror 16 and the total reflection mirror 17.

As shown in FIG. 2, the plungers 18, 19, 20, and 21 define ends of the interiors of the waveguides 13 and 14. Accordingly, the positions of the plungers 18 and 19 determine the effective length of the waveguide 13. The positions of the plungers 20 and 21 determine the effective length of the waveguide 14. The positions of the plungers 18, 19, 20, and 21 are adjusted so that antinodes of standing waves of the electric fields of the microwaves produced by the microwave generators 11 and 12 will be located at the laser tube 15. This design enables the laser medium gas 29 in the laser tube 15 to be exposed to strong electric fields. The exposure of the laser medium gas 29 to strong electric fields is advantageous in reliably producing a discharge process. It should be noted that discharge more easily starts as the intensity of an applied electric field increases.

The matching device 22 is adjusted to provide matching between the microwave generator 11 and a discharge load. The matching device 23 is adjusted to provide matching between the microwave generator 12 and the discharge load.

The laser medium gas 29 may be moved from the laser tube 15 to a cooling device before being returned to the laser tube 15 by a pump and pipes. In other words, the laser medium gas 29 may be circulated through the laser tube 15 and the cooling device.

As previously described, FIG. 3 shows an example of discharge conditions within the laser tube 15 which occur when only the y-direction electric field is applied to the laser tube 15. The discharge conditions in FIG. 3 occur in the case where only the microwave generator 11 is activated so that only the y-direction electric field is applied to the laser tube 15. The electric field at a central part of the interior of the laser tube 15 is strong while the electric fields at left-hand and right-hand (as viewed in FIG. 3) edges of the interior of the laser tube 15 are weak. Such a variation in the strength (the intensity) of the electric field corresponds to the wavelength of the microwave.

Under the discharge conditions in FIG. 3, discharge 33 occurs only in a vertically elongated narrow part of the interior of the laser tube 15 which extends along a diametrical direction of the laser tube 15. In the discharge area of the laser tube 15, the state of the discharge remains even in the "y" direction. A conceivable reason for the evenness is that the lines 30 of the electric flux are continuous in the "y" direction and hence the strength of the electric field has only a small variation in the "y" direction. On the other hand, in the "x" direction, the density of the lines of the electric flux varies greatly so that the strength of the electric field has a large variation.

As previously described, FIGS. 4 and 5 show examples of discharge conditions within the laser tube 15 which occur when both the x-direction electric field and the y-direction electric field are applied to the laser tube 15. The discharge conditions in FIGS. 4 and 5 occur in the case where both the microwave generators 11 and 12 are simultaneously activated so that both the y-direction electric field and the x-direction electric field are simultaneously applied to the laser tube 15.

Generally, there is an inevitable small difference in frequency between the microwaves produced by the microwave generators 11 and 12 since the microwave generators 11 and 12 are separate from each other. The frequency difference corresponds to several megahertz or more. The frequency difference between the electric fields of the microwaves causes a phase difference "δ" therebetween to vary as time goes by. In accordance with the time-domain variation in the phase difference "δ", the locus or the trajectory of the resultant of vectors of the electric fields cyclically changes among different forms as "circle-ellipse-straight line-circle". The frequency of the cyclic change of the trajectory of the resultant vector corresponds to the frequency difference between the electric fields.

Specifically, the resultant of the electric fields rotates at a frequency corresponding to the frequencies of the microwaves. The frequency of the rotation of the resultant electric field is equal to a value in the range of 2.4 GHz to 2.5 GHz. The state of the rotation of the resultant electric field changes at a frequency equal to the frequency difference between the microwaves. The frequency of the change of the rotation state is equal to 0.1 GHz or less.

When the direction of the resultant electric field moves into agreement with the "y" direction, the discharge conditions in FIG. 4 occur. As previously described, in this case, the state of the discharge remains even in the "y" direction. When the direction of the resultant electric field moves into agreement with the "x" direction, the discharge conditions in FIG. 5 occur. In this case, the state of the discharge remains even in the "x" direction. During a period corresponding to the frequency difference between the microwaves, the resultant electric field takes every direction in a two-dimensional space. Accordingly, the discharge area extends two-dimensionally and takes a shape having a circular cross-section as shown in FIGS. 4 and 5. The state of the discharge remains even over the discharge area.

The microwave generators 11 and 12 are designed to produce, for example, pulse microwaves. The pulse microwaves are applied to the laser tube 15. The application of the pulse microwave produced by the microwave generator 11 is substantially simultaneous with the application of the pulse microwave produced by the microwave generator 12.

Figure 6:
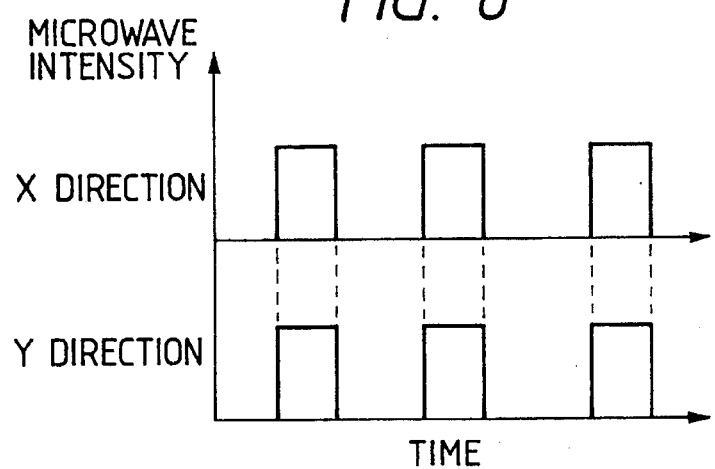
FIG. 6 is a time-domain diagram of the intensities of microwaves.

As shown in FIG. 6, the two pulse microwaves are synchronous with each other at a position of the laser tube 15. Specifically, the leading edge and the trailing edge of every pulse of the microwave produced by the microwave generator 11 are concurrent with the leading edge and the trailing edge of every pulse of the microwave produced by the microwave generator 12 respectively. In addition, the duration of every pulse of the microwave produced by the microwave generator 11 is equal to the duration of every pulse of the microwave produced by the microwave generator 12. The synchronous applications of the two pulse microwaves to the laser tube 15 are advantageous in providing an even distribution of the discharge in the laser tube 15. The synchronous applications of the two pulse microwaves to the laser tube 15 are implemented by synchronizing the activations of the microwave generators 11 and 12 in a known technique or another technique.

Generally, $CO_2$ molecules can remain at the laser-related excited states for only about 200 μs or shorter. Accordingly, to implement continuous generation of the laser light, it is preferable to intermittently and periodically excite the laser medium gas 29 at a frequency of about 5 kHz or higher. The frequency of the intermittent excitation of the laser medium gas 29 is most preferably equal to about 20 kHz or higher.

As previously described, FIG. 3 shows an example of discharge conditions within the laser tube 15 which occur when only the y-direction electric field is applied to the laser tube 15. Under the discharge conditions in FIG. 3, the discharge area occupies only 30% or less of the cross-sectional area of the interior of the laser tube 15, and the power of the output laser light is equal to about 70 W.

As previously described, FIGS. 4 and 5 show examples of discharge conditions within the laser tube 15 which occur when both the x-direction electric field and the y-direction electric field are applied to the laser tube 15. Under the discharge conditions in FIGS. 4 and 5, the discharge area occupies 80% or more of the cross-sectional area of the interior of the laser tube 15, and the power of the output laser light is equal to about 180 W or higher.

While this embodiment has the two microwave generators 11 and 12 and the two waveguides 13 and 14, at least three microwave generators and at least three waveguides may be provided.

While the directions of the vibrations of the electric fields are perpendicular to the optical axis of the laser tube 15 in this embodiment, the directions of the vibrations of the electric fields may have angles between 0° and 90° with respect to the optical axis of the laser tube 15.

While the directions of the vibrations of the electric fields are perpendicular to each other in this embodiment, the directions of the vibrations of the electric fields may have angles between 0° and 90° with respect to each other.

In this embodiment, the position of an antinode in the standing wave of the microwave produced by the microwave generator 11 can be adjusted by moving at least one of the plungers 18 and 19 along the "x" direction. In addition, the position of an antinode in the standing wave of the microwave produced by the microwave generator 12 can be adjusted by moving at least one of the plungers 20 and 21 along the "y" direction.

The plungers 18, 19, 20, and 21 take a shape of a flat plate. The plungers 18, 19, 20, and 21 may be provided with apertures which enable observation of the interior of the resonant cavity 10 from an exterior.

The waveguides 13 and 14 have, for example, a rectangular cross-section or a circular cross-section. In the case of a rectangular waveguide, microwave propagated therein assumes a TEm0 mode. In the case of a cylindrical waveguide, microwave propagated therein assumes a TE11 mode.

Each of the matching devices 22 and 23 may have two stub tuners or an EH tuner.

The walls of the resonant cavity 10 are preferably made of metal conductor.

The walls of the laser tube 15 are preferably made of dielectric material which can transmit microwave. Examples of the dielectric material are quartz glass and heat resisting glass.

The microwave generators 11 and 12 can use magnetrons.

The laser medium gas 29 may contain at least one of CO gas, $CO_2$ gas, $N_2$ gas, metal vapor, rare gas, and halogen gas.

The laser medium gas 29 may be circulated by a gas circulation system composed of the laser tube 15, a gas circulation pump, a heat exchanger, and gas pipes.

Second Embodiment

Figure 7:
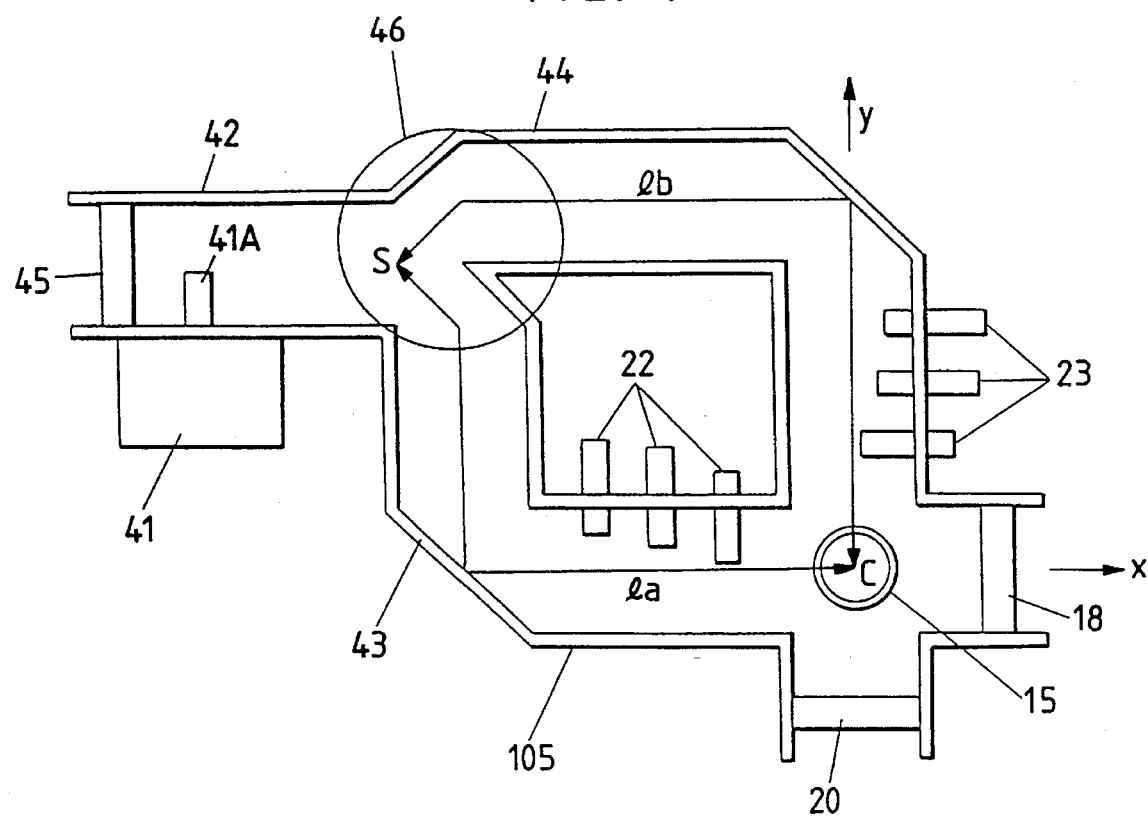
FIG. 7 is a sectional view of a microwave powered gas laser apparatus according to a second embodiment of this invention.

FIG. 7 shows a second embodiment of this invention which is similar to the embodiment of FIGS. 1 and 2 except for design changes indicated later. With reference to FIG. 7, a microwave powered gas laser apparatus includes a resonant cavity 105 formed by waveguides 42, 43, and 44. The waveguides 43 and 44 intersect with each other.

A microwave generator 41 having an antenna 41A is connected and coupled to the waveguide 42. The antenna 41A is located in the waveguide 42. The microwave generator 41 produces microwave of a given frequency which is radiated into the resonant cavity 105 via the antenna 41A.

The waveguides 42, 43, and 44 meet at a microwave divider 46. The microwave produced by the microwave generator 41 travels from the waveguide 42 to the microwave divider 46. The microwave is separated by the microwave divider 46 into two portions entering the waveguides 43 and 44 respectively.

A laser tube 15 filled with laser medium gas extends through a region of the resonant cavity 105 at which the waveguides 43 and 44 intersect with each other.

Plungers 18, 20, and 45 are movably disposed in ends of the waveguides 42, 43, and 44. The waveguide 43 is provided with a matching device 22 having three stub tuners. The waveguide 44 is provided with a matching device 23 having three stub tuners. The waveguide 42 may be provided with a matching device.

At the position of the laser tube 15, the longitudinal axis of the waveguide 43, the longitudinal axis of the waveguide 44, and the longitudinal axis (the optical axis) of the laser tube 15 are perpendicular to each other. An orthogonal coordinate system is introduced in which an "x" direction (an x-axis direction), a "y" direction (a y-axis direction), and a "z" direction (a z-axis direction) are defined as corresponding to the longitudinal axis of the waveguide 43, the longitudinal axis of the waveguide 44, and the longitudinal axis (the optical axis) of the laser tube 15 respectively at the position of the laser tube 15.

The microwave produced by the microwave generator 41 is radiated into the waveguide 42 via the antenna 41A. The microwave is propagated in the waveguide 42, and then enters the microwave divider 46. The microwave is separated by the microwave divider 46 into first and second portions referred to as first and second division-resultant microwaves respectively. The first and second division-resultant microwaves enter the waveguides 43 and 44 respectively. The first division-resultant microwave is propagated in the waveguide 43, and is subjected to a matching process by the matching device 22 before being applied to the laser tube 15. The second division-resultant microwave is propagated in the waveguide 44, and is subjected to a matching process by the matching device 23 before being applied to the laser tube 15.

The waveguides 43 and 44 intersect with each other in a region containing the laser tube 15. The waveguides 43 and 44 meet at a right angle. In the position of the laser tube 15, the direction of travel of the first division-resultant microwave is perpendicular to the direction of travel of the second division-resultant microwave. Furthermore, the direction of a variation in the electric field of the first division-resultant microwave is perpendicular to the direction of a variation in the electric field of the second division-resultant microwave. In other words, the direction of an electric field vector of the first division-resultant microwave is perpendicular to the direction of an electric field vector of the second division-resultant microwave. It is preferable that, in the position of the laser tube 15, the direction of the electric field of the first division-resultant microwave, the direction of the electric field of the second division-resultant microwave, and the direction of the optical axis of the laser tube 15 are perpendicular to each other.

In the position of the laser tube 15, there is a phase difference of 90° between the first division-resultant microwave and the second division-resultant microwave. Accordingly, a resultant of the first and second division-resultant microwaves agrees with circularly polarized wave. Thus, during a short period, the electric field of the resultant microwave takes every direction in a two-dimensional space. This is advantageous in making even the state of discharge.

The 90° phase difference between the first division-resultant microwave and the second division-resultant microwave is implemented by the following design. The distance la between the point S of the microwave division within the microwave divider 46 and the center C of the laser tube 15 along the waveguide 43 is set different from the distance lb between the point S of the microwave division within the microwave divider 46 and the center C of the laser tube 15 along the waveguide 44. The difference DF between the distances la and lb is chosen as follows.

$$DF = \{(1/4) + (N/2)\} \cdot L$$

where "L" denotes the wavelength of the microwave, and "N" denotes an integer equal to 0 or greater. For example, the difference DF is set to a quarter of the wavelength. It should be noted that the distances la and lb are the lengths of paths of propagation of the microwaves respectively.

The 90° phase difference between the first division-resultant microwave and the second division-resultant microwave may be implemented by a phase shifter disposed in at least one of the waveguides 43 and 44. The phase shifter can be made of material having a dielectric constant different from that of substance in the waveguide.

The phase difference between the first division-resultant microwave and the second division-resultant microwave in the position of the laser tube 15 may be deviated from 90°. The phase difference between the first division-resultant microwave and the second division-resultant microwave in the position of the laser tube 15 is preferably in the range of 85.5° to 94.5°. The difference DF between the distances la and lb may be deviated from the value "$\{(1/4)+(N/2)\} \cdot L$" by an amount in the range of −5% to +5%.

While the waveguide is divided into two in this embodiment, the waveguide may be divided into three or more.

While the directions of the vibrations of the electric fields of the first and second division-resultant microwaves are perpendicular to the optical axis of the laser tube 15 in this embodiment, the directions of the vibrations of the electric fields may have angles between 0° and 90° with respect to the optical axis of the laser tube 15.

In this embodiment, an antinode in the standing wave of the first division-resultant microwave is located at the laser tube 15 by adjusting the position of at least one of the plungers 18 and 45. In addition, an antinode in the standing wave of the second division-resultant microwave is located at the laser tube 15 by adjusting the position of at least one of the plungers 20 and 45.

The plungers 18, 20, and 45 take a shape of a flat plate. The plungers 18, 20, and 45 may be provided with apertures which enable observation of the interior of the resonant cavity 105 from an exterior.

The waveguides 42, 43, and 44 have, for example, a rectangular cross-section or a circular cross-section. In the case of a rectangular waveguide, microwave propagated therein assumes a TEm0 mode. In the case of a cylindrical waveguide, microwave propagated therein assumes a TE11 mode.

Each of the matching devices 22 and 23 may have two stub tuners or an EH tuner.

The walls of the resonant cavity 105 are preferably made of metal conductor.

The walls of the laser tube 15 are preferably made of dielectric material which can transmit microwave. Examples of the dielectric material are quartz glass and heat resisting glass.

The microwave generator 41 can use a magnetron.

The laser medium gas in the laser tube 15 may contain at least one of CO gas, $CO_2$ gas, $N_2$ gas, metal vapor, rare gas, and halogen gas.

The laser medium gas in the laser tube 15 may be circulated by a gas circulation system composed of the laser tube 15, a gas circulation pump, a heat exchanger, and gas pipes.

Third Embodiment

Figure 8:
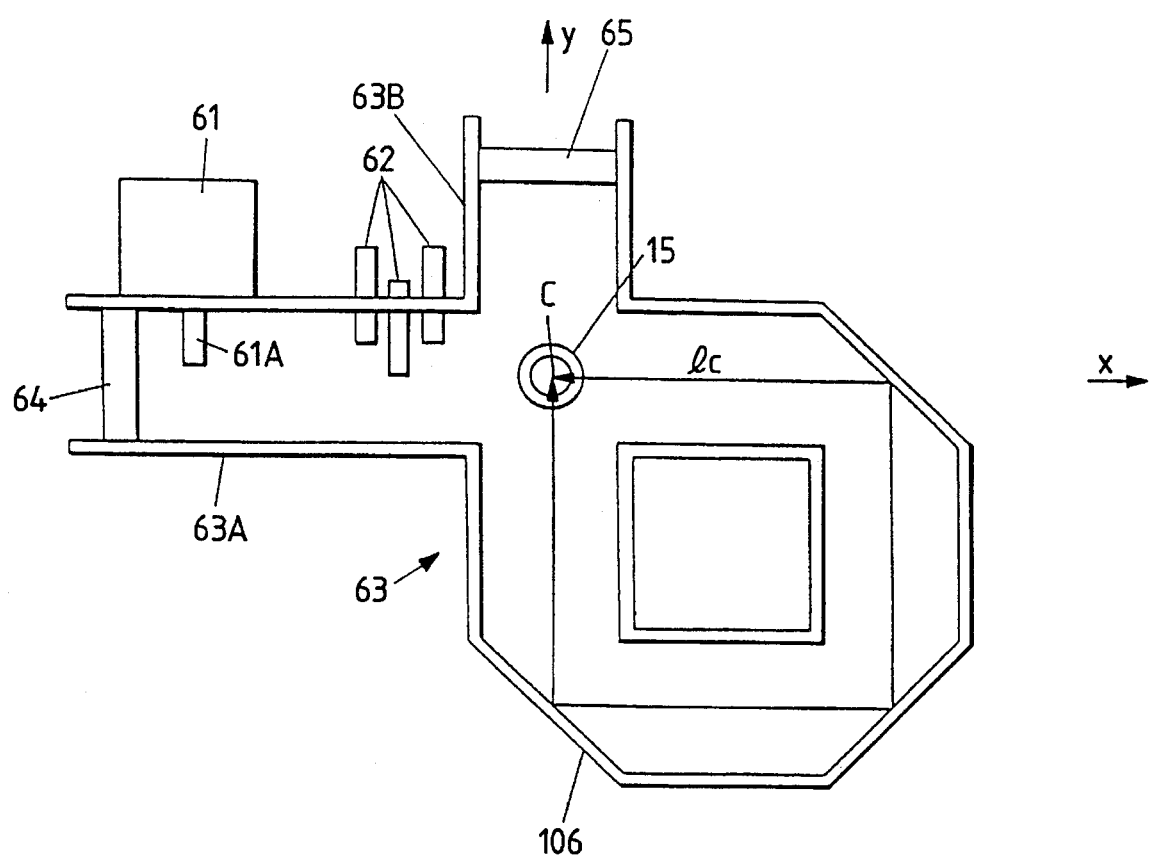
FIG. 8 is a sectional view of a microwave powered gas laser apparatus according to a third embodiment of this invention.

FIG. 8 shows a third embodiment of this invention which is similar to the embodiment of FIGS. 1 and 2 except for design changes indicated later. With reference to FIG. 8, a microwave powered gas laser apparatus includes a resonant cavity 106 formed by a waveguide arrangement 63. The waveguide arrangement 63 has portions referred to as waveguides 63A and 63B respectively. The waveguides 63A and 63B intersect with each other. The waveguides 63A and 63B are preferably integral with each other.

A microwave generator 61 having an antenna 61A is connected and coupled to the waveguide 63A. The antenna 61A is located in the waveguide 63A. The microwave generator 61 produces microwave of a given frequency which is radiated into the resonant cavity 106 via the antenna 61A.

The waveguide 63A has an end in which a plunger 64 is movably disposed. The waveguide 63B has an end in which a plunger 65 is movably disposed. Portions of the waveguides 63A and 63B remote from their ends form a loop waveguide having a part at which the waveguides 63A and 63B intersect with each other.

The microwave produced by the microwave generator 61 travels along the waveguide 63A, and then enters the loop waveguide before passing therethrough and reaching the waveguide 63B. Then, the microwave travels along the waveguide 63B.

A laser tube 15 filled with laser medium gas extends through a region of the resonant cavity 106 at which the waveguides 63A and 63B intersect with each other.

The waveguide 63A is provided with a matching device 62 having three stub tuners. It should be noted that the matching device 62 may be located at another position within the resonant cavity 106.

At the position of the laser tube 15, the longitudinal axis of the waveguide 63A, the longitudinal axis of the waveguide 63B, and the longitudinal axis (the optical axis) of the laser tube 15 are perpendicular to each other. An orthogonal coordinate system is introduced in which an "x" direction (an x-axis direction), a "y" direction (a y-axis direction), and a "z" direction (a z-axis direction) are defined as corresponding to the longitudinal axis of the waveguide 63A, the longitudinal axis of the waveguide 63B, and the longitudinal axis (the optical axis) of the laser tube 15 respectively at the position of the laser tube 15.

The microwave produced by the microwave generator 61 is radiated into the waveguide 63A via the antenna 61A. The microwave is propagated in the waveguide 63A, and is subjected to a matching process by the matching device 62. The microwave is applied to the laser tube 15 while being propagated in the waveguide 63A. Then, the microwave enters the loop waveguide, passing through the loop waveguide and reaching the waveguide 63B. Subsequently, the microwave is propagated in the waveguide 63B while being applied to the laser tube 15.

The waveguides 63A and 63B intersect with each other in a region containing the laser tube 15. The waveguides 63A and 63B meet at a right angle. In the position of the laser tube 15, the direction of travel of the microwave in the waveguide 63A is perpendicular to the direction of travel of the microwave in the waveguide 63B. Furthermore, the direction of a variation in the electric field of the microwave in the waveguide 63A is perpendicular to the direction of a variation in the electric field of the microwave in the waveguide 63B. In other words, the direction of an electric field vector of the microwave in the waveguide 63A is perpendicular to the direction of an electric field vector of the microwave in the waveguide 63B. It is preferable that, in the position of the laser tube 15, the direction of the electric field of the microwave in the waveguide 63A, the direction of the electric field of the microwave in the waveguide 63B, and the direction of the optical axis of the laser tube 15 are perpendicular to each other.

In the position of the laser tube 15, there is a phase difference of 90° between the microwave in the waveguide 63A and the microwave in the waveguide 63B. Accordingly, a resultant of the microwaves agrees with circularly polarized wave. Thus, during a short period, the electric field of the resultant microwave takes every direction in a two-dimensional space. This is advantageous in making even the state of discharge.

The 90° phase difference between the microwave in the waveguide 63A and the microwave in the waveguide 63B is implemented by the following design. The effective distance or the effective length lc of the loop waveguide is set to a value given as follows.

$$lc = \{(1/4) + (N/2)\} \cdot L$$

where "L" denotes the wavelength of the microwave, and "N" denotes an integer equal to 0 or greater. For example, the effective distance lc is set to a quarter of the wavelength. It should be noted that the effective difference lc agrees with the length of square microwave path in the loop waveguide which starts from the center C of the laser tube 15 and ending at the center C of the laser tube 15.

The 90° phase difference between the microwave in the waveguide 63A and the microwave in the waveguide 63B may be implemented by a phase shifter disposed in the resonant cavity 106. The phase shifter can be made of material having a dielectric constant different from that of substance in the resonant cavity 106.

The phase difference between the microwave in the waveguide 63A and the microwave in the waveguide 63B may be deviated from 90°. The phase difference between the microwave in the waveguide 63A and the microwave in the waveguide 63B is preferably in the range of 85.5° to 94.5°. The effective distance may be deviated from the value "$\{(1/4)+(N/2)\} \cdot L$" by an amount in the range of −5% to +5%.

While the waveguide arrangement 63 has two portions intersecting with each other in this embodiment, the waveguide arrangement 63 may have at least three portions intersecting with each other.

While the directions of the vibrations of the electric fields of the microwaves in the waveguides 63A and 63B are perpendicular to the optical axis of the laser tube 15 in this embodiment, the directions of the vibrations of the electric fields may have angles between 0° and 90° with respect to the optical axis of the laser tube 15.

In this embodiment, an antinode in the standing wave of the microwave in the waveguide 63A is located at the laser tube 15 by adjusting the position of the plunger 64. In addition, an antinode in the standing wave of the microwave in the waveguide 63B is located at the laser tube 15 by adjusting the position of the plunger 65.

The plungers 64 and 65 take a shape of a flat plate. The plungers 64 and 65 may be provided with apertures which enable observation of the interior of the resonant cavity 106 from an exterior.

The waveguides 63A and 63B have, for example, a rectangular cross-section or a circular cross-section. In the case of a rectangular waveguide, microwave propagated therein assumes a TEm0 mode. In the case of a cylindrical waveguide, microwave propagated therein assumes a TE11 mode.

The matching device 62 may have two stub tuners or an EH tuner.

The walls of the resonant cavity 106 are preferably made of metal conductor.

The walls of the laser tube 15 are preferably made of dielectric material which can transmit microwave. Examples of the dielectric material are quartz glass and heat resisting glass.

The microwave generator 61 can use a magnetron.

The laser medium gas in the laser tube 15 may contain at least one of CO gas, $CO_2$ gas, $N_2$ gas, metal vapor, rare gas, and halogen gas.

The laser medium gas in the laser tube 15 may be circulated by a gas circulation system composed of the laser tube 15, a gas circulation pump, a heat exchanger, and gas pipes.

Fourth Embodiment

Figure 9:
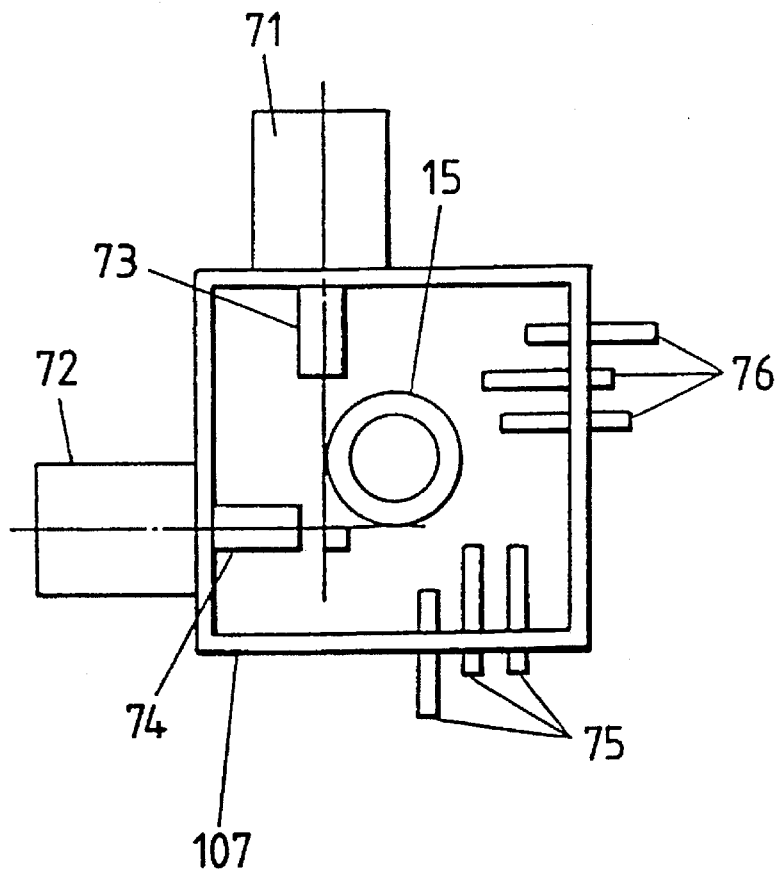
FIG. 9 is a sectional view of a microwave powered gas laser apparatus according to a fourth embodiment of this invention.

FIG. 9 shows a fourth embodiment of this invention which is similar to the embodiment of FIGS. 1 and 2 except for design changes indicated later. With reference to FIG. 9, a microwave powered gas laser apparatus includes a resonant cavity 107 having a rectangular parallelepiped configuration.

A microwave generator 71 having an antenna 73 is provided on an upper side of the resonant cavity 107. The antenna 73 is located In the resonant cavity 107. The microwave generator 71 produces microwave of a given frequency which is radiated into the resonant cavity 107 via the antenna 73. A microwave generator 72 having an antenna 74 is provided on a left-hand side of the resonant cavity 107. The antenna 74 is located in the resonant cavity 107. The microwave generator 72 produces microwave of a given frequency which is radiated into the resonant cavity 107 via the antenna 74.

A matching device 75 having three stub tuners is provided on a lower side of the resonant cavity 107. A matching device 76 having three stub tuners is provided on a right-hand side of the resonant cavity 107. The matching devices 75 and 76 act on the microwaves produced by the microwave generators 71 and 72.

A laser tube 15 filled with laser medium gas extends through a central region of the resonant cavity 107. The laser tube 15 is exposed to the microwaves produced by the microwave generators 71 and 72.

The positions and the directivities of the antennas 73 and 74 are chosen so that the directions of the electric fields of the microwaves produced by the microwave generators 71 and 72 will be perpendicular to each other at the position of the laser tube 15. In addition, the directions of the electric fields of the microwaves produced by the microwave generators 71 and 72 are perpendicular to the optical axis of the laser tube 15. Furthermore, antinodes in the standing waves of the microwaves produced by the microwave generators 71 and 72 are located at the laser tube 15.

While this embodiment has the two microwave generators 71 and 72, at least three microwave generators may be provided.

While the directions of the vibrations of the electric fields are perpendicular to the optical axis of the laser tube 15 in this embodiment, the directions of the vibrations of the electric fields may have angles between 0° and 90° with respect to the optical axis of the laser tube 15.

While the directions of the vibrations of the electric fields are perpendicular to each other in this embodiment, the directions of the vibrations of the electric fields may have angles between 0° and 90° with respect to each other.

Each of the matching devices 75 and 76 may have two stub tuners or an EH tuner.

The walls of the resonant cavity 107 are preferably made of metal conductor.

The walls of the laser tube 15 are preferably made of dielectric material which can transmit microwave. Examples of the dielectric material are quartz glass and heat resisting glass.

The microwave generators 71 and 72 can use magnetrons.

The laser medium gas in the laser tube 15 may contain at least one of CO gas, $CO_2$ gas, $N_2$ gas, metal vapor, rare gas, and halogen gas.

The laser medium gas in the laser tube 15 may be circulated by a gas circulation system composed of the laser tube 15, a gas circulation pump, a heat exchanger, and gas pipes.

Fifth Embodiment

Figure 10:
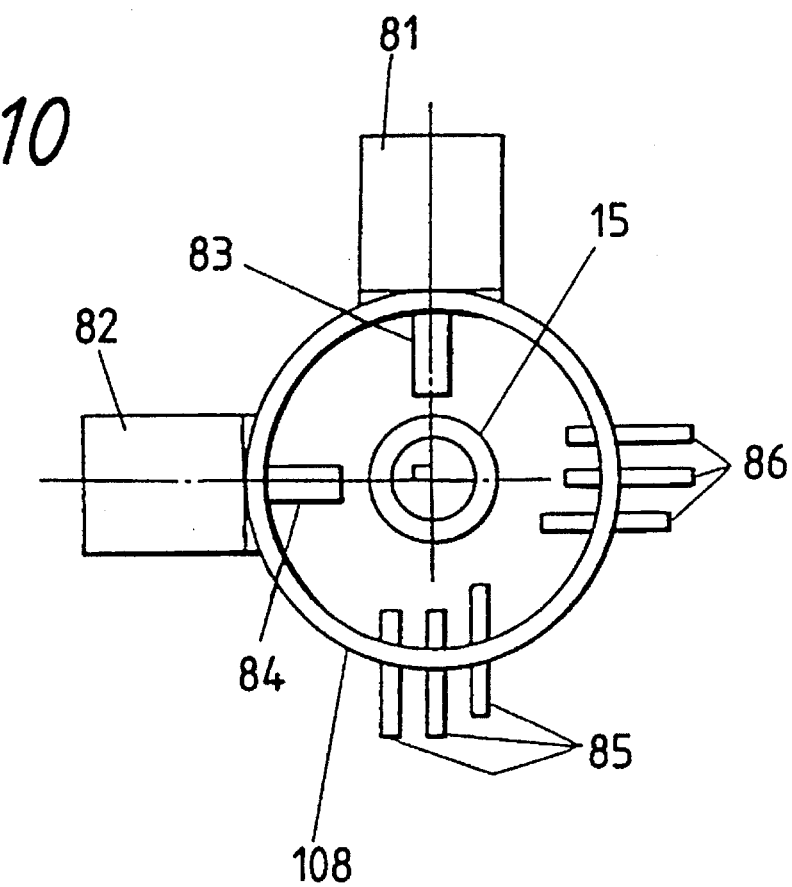
FIG. 10 is a sectional view of a microwave powered gas laser apparatus according to a fifth embodiment of this invention.

FIG. 10 shows a fifth embodiment of this invention which is similar to the embodiment of FIGS. 1 and 2 except for design changes indicated later. With reference to FIG. 10, a microwave powered gas laser apparatus includes a resonant cavity 108 having a cylindrical configuration.

A microwave generator 81 having an antenna 83 is provided on an upper side of the resonant cavity 108. The antenna 83 is located in the resonant cavity 108. The microwave generator 81 produces microwave of a given frequency which is radiated into the resonant cavity 108 via the antenna 83. A microwave generator 82 having an antenna 84 is provided on a left-hand side of the resonant cavity 108. The antenna 84 is located in the resonant cavity 108. The microwave generator 82 produces microwave of a given frequency which is radiated into the resonant cavity 108 via the antenna 84.

A matching device 85 having three stub tuners is provided on a lower side of the resonant cavity 108. A matching device 86 having three stub tuners is provided on a right-hand side of the resonant cavity 108. The matching devices 85 and 86 act on the microwaves produced by the microwave generators 81 and 82.

A laser tube 15 filled with laser medium gas extends through a central region of the resonant cavity 108. The laser tube 15 is exposed to the microwaves produced by the microwave generators 81 and 82.

The positions and the directivities of the antennas 83 and 84 are chosen so that the directions of the electric fields of the microwaves produced by the microwave generators 81 and 82 will be perpendicular to each other at the position of the laser tube 15. In addition, the directions of the electric fields of the microwaves produced by the microwave generators 81 and 82 are perpendicular to the optical axis of the laser tube 15. Furthermore, antinodes in the standing waves of the microwaves produced by the microwave generators 81 and 82 are located at the laser tube 15.

While this embodiment has the two microwave generators 81 and 82, at least three microwave generators may be provided.

While the directions of the vibrations of the electric fields are perpendicular to the optical axis of the laser tube 15 in this embodiment, the directions of the vibrations of the electric fields may have angles between 0° and 90° with respect to the optical axis of the laser tube 15.

While the directions of the vibrations of the electric fields are perpendicular to each other In this embodiment, the directions of the vibrations of the electric fields may have angles between 0° and 90° with respect to each other.

Each of the matching devices 85 and 86 may have two stub tuners or an EH tuner.

The walls of the resonant cavity 108 are preferably made of metal conductor.

The walls of the laser tube 15 are preferably made of dielectric material which can transmit microwave. Examples of the dielectric material are quartz glass and heat resisting glass.

The microwave generators 81 and 82 can use magnetrons.

The laser medium gas in the laser tube 15 may contain at least one of CO gas, $CO_2$ gas, $N_2$ gas, metal vapor, rare gas, and halogen gas.

The laser medium gas in the laser tube 15 may be circulated by a gas circulation system composed of the laser tube 15, a gas circulation pump, a heat exchanger, and gas pipes.

Sixth Embodiment

A sixth embodiment of this invention is similar to the embodiment of FIGS. 1 and 2 except for an additional arrangement indicated later. It is preferable to optimize the duty cycle of pulse microwaves in accordance with the velocity of flow of laser medium gas 29 In a laser tube 15 (see FIG. 2): The optimization of the duty cycle prevents the laser medium gas 29 from being excessively heated.

Figure 11:
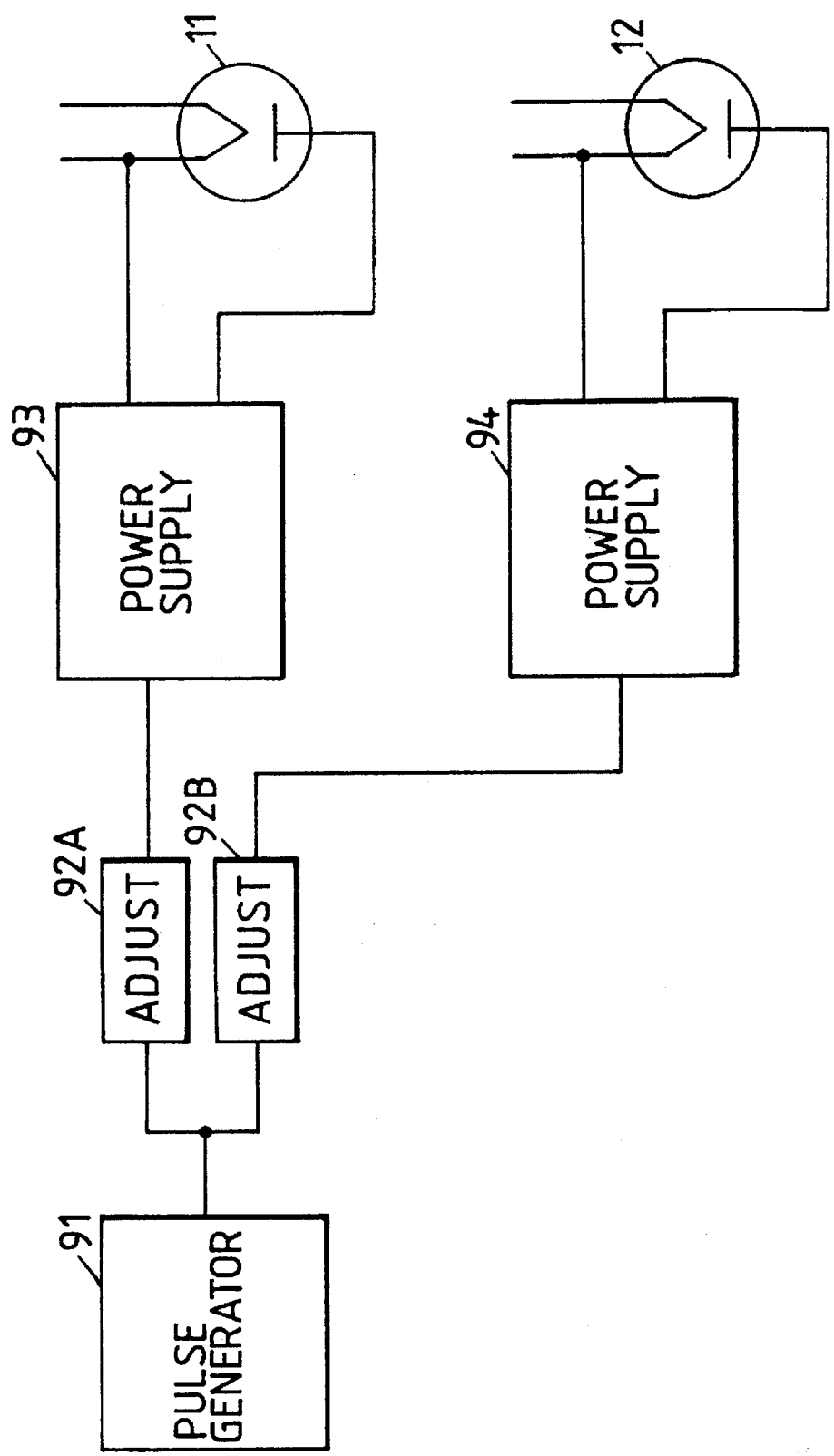
FIG. 11 is a diagram of a part of a microwave powered gas laser apparatus according to a sixth embodiment of this invention.

With reference to FIG. 11, a microwave powered gas laser apparatus includes microwave generators 11 and 12 electrically connected to power supplies 93 and 94 respectively. A pulse generator 91 is electrically connected to pulse adjusting circuits 92A and 92B. The pulse adjusting circuits 92A and 92B are electrically connected to the power supplies 93 and 94 respectively.

The pulse generator 91 produces a pulse signal having an adjustable frequency. The pulse generator 91 outputs the produced pulse signal to the pulse adjusting circuits 92A and 92B. The pulse adjusting circuit 92A converts the output signal of the pulse generator 91 into a pulse signal which is delayed from the output signal of the pulse generator 91 by an adjustable time, and which has an adjustable duty cycle. The pulse adjusting circuit 92A outputs the conversion-resultant pulse signal to the power supply 93. The pulse adjusting circuit 92B converts the output signal of the pulse generator 91 into a pulse signal which is delayed from the output signal of the pulse generator 91 by an adjustable time, and which has an adjustable duty cycle. The pulse adjusting circuit 92B outputs the conversion-resultant pulse signal to the power supply 94. Each of the pulse adjusting circuits 92A and 92B can be formed by a series combination of a variable delay device and an adjustable monostable multivibrator.

The power supply 93 generates high-voltage pulses in response to the output signal of the pulse adjusting circuit 92A, and feeds the generated high-voltage pulses to the microwave generator 11. The microwave generator 11 is driven and activated by the high-voltage pulses fed from the power supply 93. Therefore, the microwave generator 11 produces microwave pulses in response to the high-voltage pulses fed from the power supply 93.

The power supply 94 generates high-voltage pulses in response to the output signal of the pulse adjusting circuit 92B, and feeds the generated high-voltage pulses to the microwave generator 12. The microwave generator 12 is driven and activated by the high-voltage pulses fed from the power supply 94. Therefore, the microwave generator 12 produces microwave pulses in response to the high-voltage pulses fed from the power supply 94.

The frequency of the high-voltage pulses generated by the power supply 93, that is, the frequency of the microwave pulses produced by the microwave generator 11, can be adjusted by the pulse generator 91. Also, the frequency of the high-voltage pulses generated by the power supply 94, that is, the frequency of the microwave pulses produced by the microwave generator 12, can be adjusted by the pulse generator 91.

The duty cycle of the high-voltage pulses generated by the power supply 93, that is, the duty cycle of the microwave pulses produced by the microwave generator 11, can be adjusted by the pulse adjusting circuit 92A. Also, the duty cycle of the high-voltage pulses generated by the power supply 94, that is, the duty cycle of the microwave pulses produced by the microwave generator 12, can be adjusted by the pulse adjusting circuit 92B.

The phase relation between the microwave pulses produced by the microwave generator 11 and the microwave pulses produced by the microwave generator 12 can be adjusted by at least one of the pulse adjusting circuits 92A and 92B.

Figure 12:
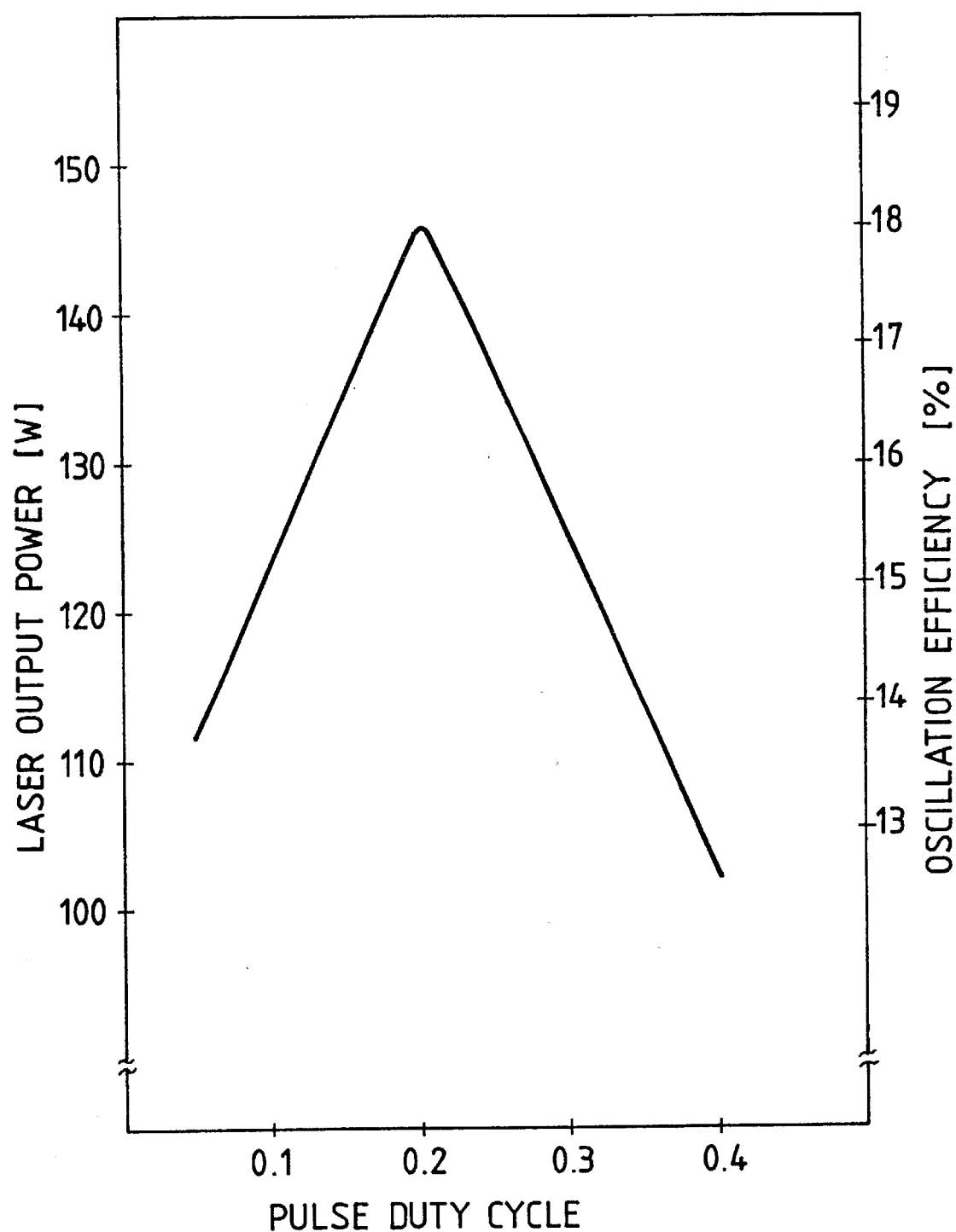
FIG. 12 is a diagram of the relation among a laser power output, a laser oscillation efficiency, and a pulse duty cycle.

Experiments were carried out as follows. A duty cycle was defined as being equal to a ratio between an average power (a mean power) applied to the microwave generators 11 and 12 and a peak current fed to the microwave generators 11 and 12. As shown in FIG. 12, the laser oscillation efficiency increased in accordance with a change of the duty cycle from 0.05 to 0.2. The laser oscillation efficiency was maximized to 18.1% when the duty cycle reached about 0.2. The laser oscillation efficiency dropped as the duty cycle increased from about 0.2. For a good laser oscillation efficiency, the duty cycle was preferably in the range of 0.1 to 0.3.

During the experiments, electric drive pulses having different duty cycles were fed to the microwave generators 11 and 12. In addition, the timing of occurrence of the microwave pulses having x-direction electric fields was shifted (offset) step by step relative to the timing of occurrence of the microwave pulses having y-direction electric fields.

Specifically, the frequency of the output signal of the pulse generator 91 was set to 25 kHz. The duty cycle of the microwave pulses having y-direction electric fields was set to 20.0% by the pulse adjusting circuit 92B. The duty cycle of the microwave pulses having x-direction electric fields was set to 15.0% by the pulse adjusting circuit 92A. The microwave input power was set to 956 W. The timing of occurrence of the microwave pulses having x-direction electric fields was shifted (offset) 1 µs by 1 µs relative to the timing of occurrence of the microwave pulses having y-direction electric fields in the range of −5 µs to +5 µs.

Figure 13:
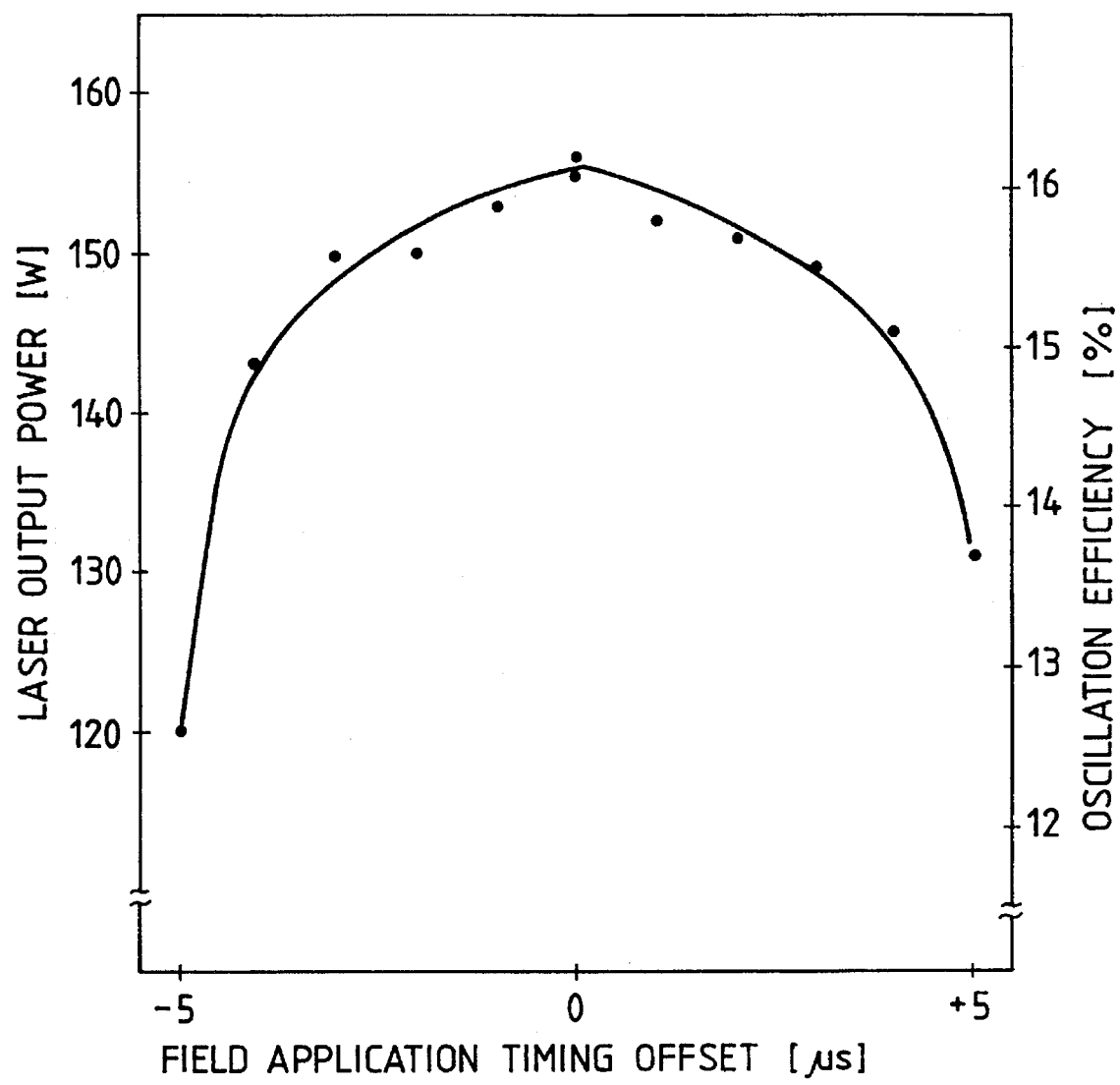
FIG. 13 is a diagram of the relation among a laser power output, a laser oscillation efficiency, and a difference in timing between microwave pulses.

As shown in FIG. 13, the laser output power was equal to 131 W and the laser oscillation efficiency was equal to 13.7% when the timing of occurrence of the microwave pulses having x-direction electric fields was advanced from the timing of occurrence of the microwave pulses having y-direction electric fields by 5 µs. The laser output power was maximized to 156 W and the laser oscillation efficiency was peaked to 16.3% when the timing of occurrence of the microwave pulses having x-direction electric fields agreed with the timing of occurrence of the microwave pulses having y-direction electric fields. The laser output power was equal to 120 W and the laser oscillation efficiency was equal to 12.5% when the timing of occurrence of the microwave pulses having x-direction electric fields was delayed from the timing of occurrence of the microwave pulses having y-direction electric fields by 5 µs.

As understood from FIG. 13, for a good laser oscillation efficiency, it was preferable to hold the timing difference between the two microwaves within the range of −1 µs to +1 µs.

Seventh Embodiment

Figure 14:
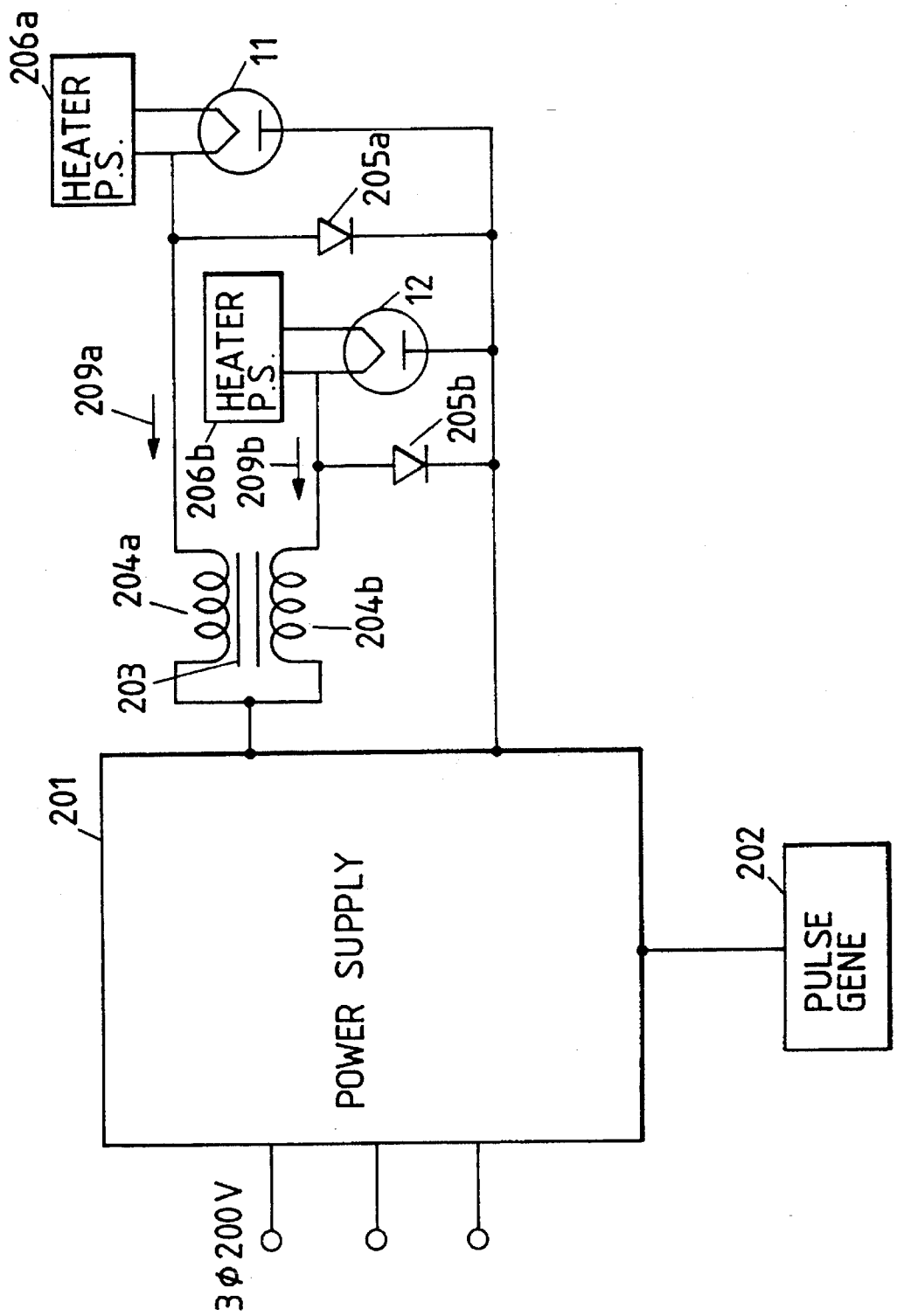
FIG. 14 is a diagram of a part of a microwave powered gas laser apparatus according to a seventh embodiment of this invention.

A seventh embodiment of this invention is similar to the embodiment of FIGS. 1 and 2 except for an additional arrangement indicated later. With reference to FIG. 14, a microwave powered gas laser apparatus includes microwave generators 11 and 12 composed of magnetrons respectively.

The anodes of the magnetrons 11 and 12 are electrically connected to the positive output terminal or the ground terminal of a high-voltage power supply 201. The magnetrons 11 and 12 have heaters serving as cathodes. The heater of the magnetron 11 is electrically connected to a heater power supply 206a. A heater current is driven through the heater of the magnetron 11 by the heater power supply 206a. The heater of the magnetron 12 is electrically connected to a heater power supply 206b. A heater current is driven through the heater of the magnetron 12 by the heater power supply 206b.

The anode of a diode 205a is electrically connected to the heater of the magnetron 11. The cathode of the diode 205a is electrically connected to the anode of the magnetron 11. The diode 205a protects the magnetron 11 from a surge current. The anode of a diode 205b is electrically connected to the heater of the magnetron 12. The cathode of the diode 205b is electrically connected to the anode of the magnetron 12. The diode 205b protects the magnetron 12 from a surge current.

The heater of the magnetron 11 is electrically connected to the negative output terminal of the high-voltage power supply 201 via a winding 204a in a magnetic circuit 203. The heater of the magnetron 12 is electrically connected to the negative output terminal of the high-voltage power supply 201 via a winding 204b in the magnetic circuit 203.

The high-voltage power supply 201 is electrically connected to a three-phase ac line. The high-voltage power supply 201 is electrically connected to a pulse generator 202. The pulse generator 202 produces a pulse signal having an adjustable frequency. The high-voltage power supply 201 derives a negative high dc voltage from an ac voltage fed via the three-phase ac line. The derived negative high dc voltage is equal to, for example, −5,000 V. The derived negative high dc voltage may be variable by the operation of a voltage adjusting circuit provided in the high-voltage power supply 201. The ac voltage on the three-phase ac line is equal to, for example, 200 V. The high-voltage power supply 201 includes a switching device via which the negative high dc voltage is selectively transmitted to its output terminals. The switching device changes between an open state and a closed state in response to the pulse signal produced by the pulse generator 202. Accordingly, the high-voltage power supply 201 outputs pulses of the high voltage to the magnetrons 11 and 12.

Generally, the magnetrons 11 and 12 start to operate when an anode voltage applied thereto increases to about 3,900 V. During operation of the magnetrons 11 and 12, a current therethrough (a magnetron current) can be varied in the range of 0 to 300 mA as the anode voltage is changed by several hundreds of volts. The magnetrons 11 and 12 can use model "2M244" made by Matsushita Electric Industrial Co., Ltd. A change of the anode voltage in the range of −30 V to +30 V around 4,100 V enables an adjustment of the magnetron current over the range of −25 mA to +25 mA around 200 mA. In other words, a change of the anode voltage by ±0.7% enables a variation of the magnetron current by ±12.5%.

Figure 15:
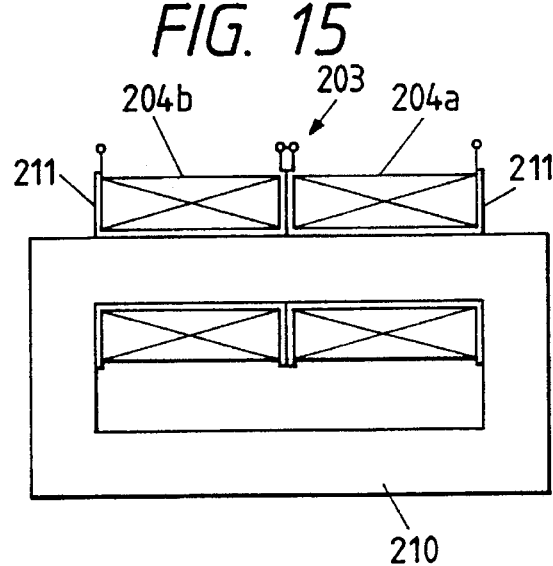
FIG. 15 is a sectional view of a magnetic circuit in the apparatus of FIG. 14.

As shown in FIG. 15, the magnetic circuit 203 includes a ferrite core 210 having a rectangular loop configuration. Bobbins 211 fit around an upper side of the ferrite core 210. The windings 204a and 204b are provided on the bobbins 211 respectively. The windings 204a and 204b are arranged to cancel magnetic fields generated thereby. For example, each of the windings 204a and 204b has 350 turns of a coated copper wire of a 0.35-mm diameter around the bobbin 211.

With reference back to FIG. 14, the magnetron current 209a related to the magnetron 11 flows through the winding 204a. The magnetron current 209b related to the magnetron 12 flows through the winding 204b. The magnetic fields generated by the windings 204a and 204b are completely canceled when the magnetic currents 209a and 209b are equal to each other.

The windings 204a and 204b are magnetically coupled with each other. If there is an unbalance between the magnetron currents 209a and 209b, the magnetic coupling between the windings 204a and 204b induces a current compensating the unbalance as the magnetron currents 209a and 209b flow through the windings 204a and 204b. Thus, the windings 204a and 204b serve to balance the magnetron currents 209a and 209b each other, that is, to balance operations of the magnetrons 11 and 12 each other.

The high-voltage pulses applied to the magnetrons 11 and 12 have a frequency in the range of, for example, 10 to 100 kHz. The magnetron currents 209a and 209b can be equalized with respect to each other in the range of, for example, 10 to 300 mA.

It should be noted that three or more magnetrons may be provided which are connected in parallel.

The magnetic circuit 203 may be modified into an arrangement where the windings 204a and 204b are located on opposite sides of the ferrite core 210.

Eighth Embodiment

Figure 16:
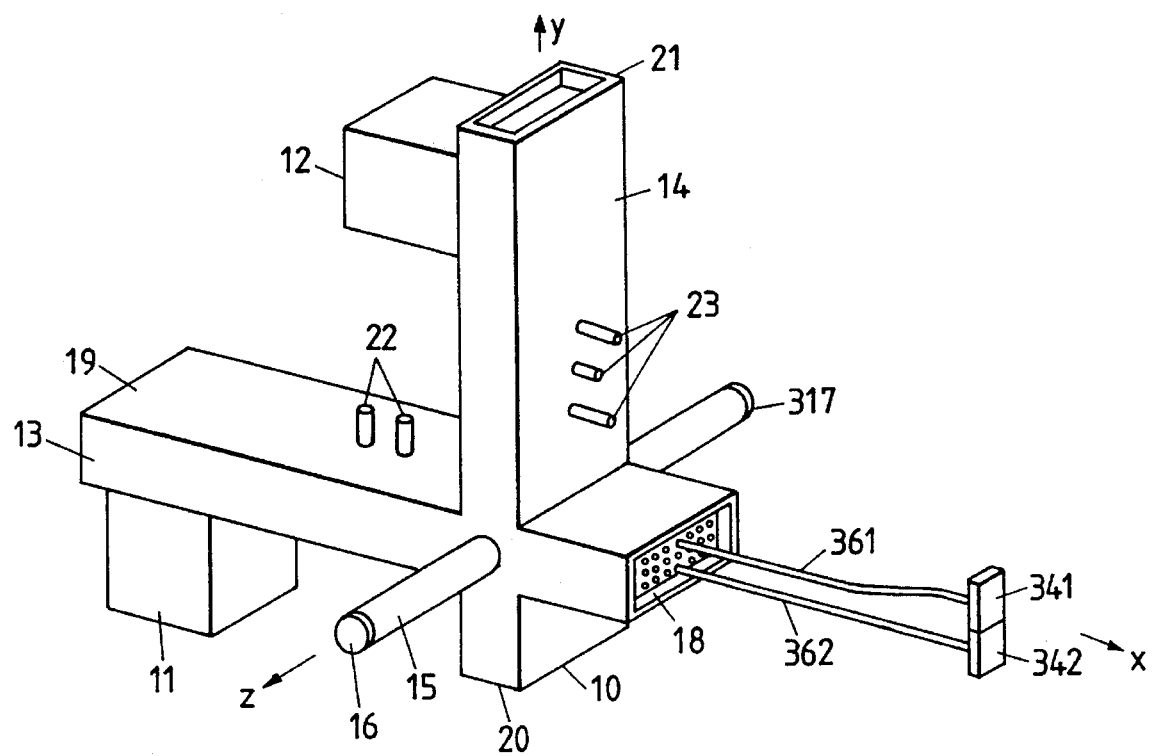
FIG. 16 is a perspective view of a microwave powered gas laser apparatus according to an eighth embodiment of this invention.

FIG. 16 shows an eighth embodiment of this invention which is similar to the embodiment of FIGS. 1 and 2 except for an additional arrangement indicated later. With reference to FIG. 16, a microwave powered gas laser apparatus includes photodetectors 341 and 342 of, for example, the avelanche type which are located outside a resonant cavity 10. The interior of a waveguide 13 is optically connected to the photodiodes 341 and 342 via optical transmission lines 361 and 362 including, for example, optical fiber cables.

Figure 17:
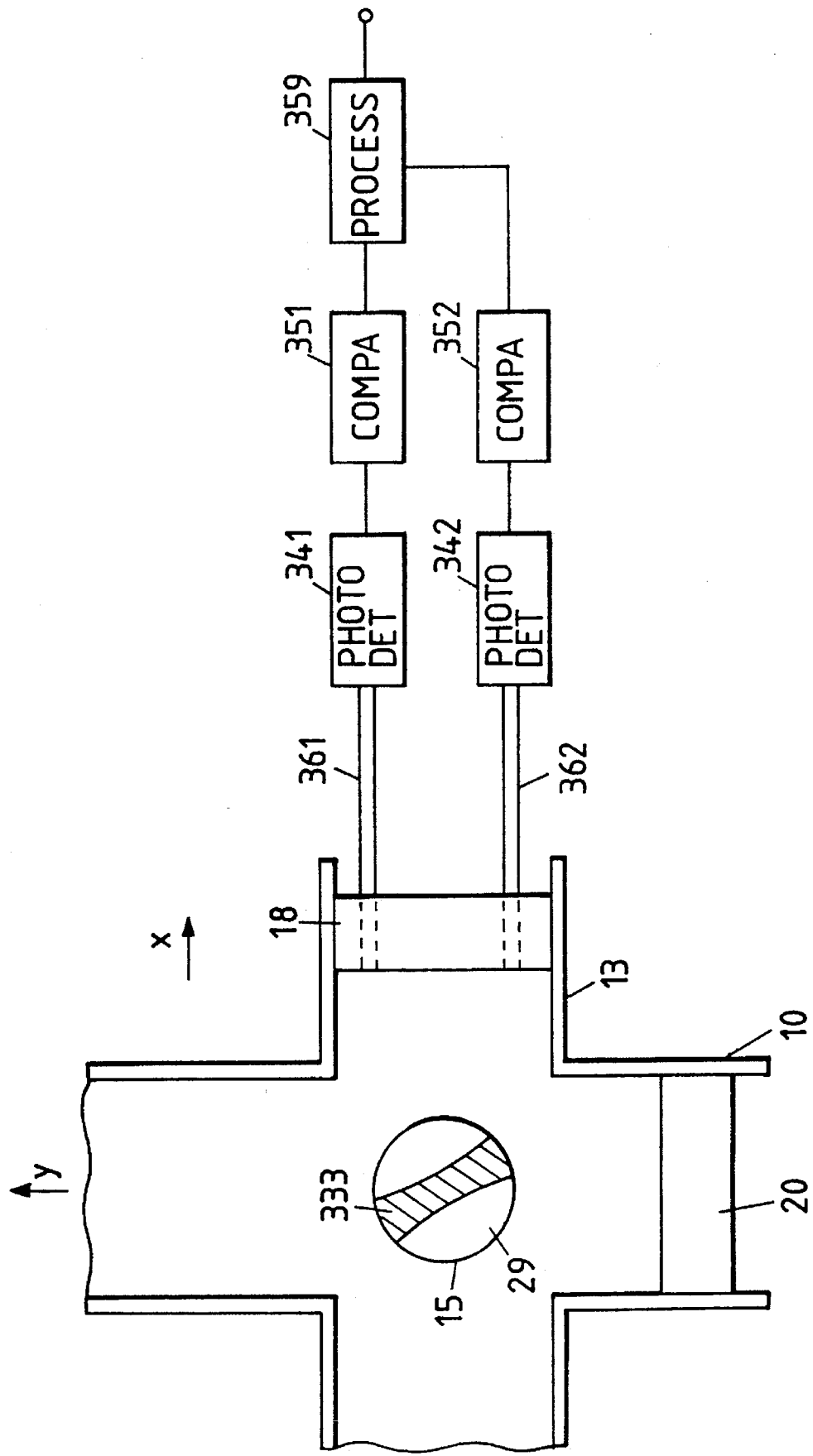
FIG. 17 is a diagram of a part of the apparatus in FIG. 16.

As shown in FIGS. 16 and 17, the optical transmission lines 361 and 362 extend through a plunger 18 at an end of the waveguide 13. Ends of the optical transmission lines 361 and 362 are exposed at the interior of the waveguide 13 so that they can receive light emitted from a laser tube 15 within the resonant cavity 10. Specifically, the ends of the optical transmission lines 361 and 362 are spaced from each other in the diametrically vertical direction with respect to the laser tube 15. The end of the optical transmission line 361 is positioned to receive light emitted from an upper part of the laser tube 15. On the other hand, the end of the optical transmission line 362 is positioned to receive light emitted from a lower part of the laser tube 15.

As shown in FIG. 17, the photodetectors 341 and 342 are electrically connected to comparators 351 and 352 respectively. The comparators 351 and 352 are electrically connected to a processor 359.

A portion of light generated in a region of the laser tube 15 near an upper wall thereof travels to the end of the optical transmission line 361, and is then propagated to the photodetector 341 through the optical transmission line 361. The photodetector 341 converts the applied light into a corresponding electric signal. The photodetector 341 outputs the electric signal to the comparator 351. The output signal of the photodetector 341 has a voltage depending on the intensity of the applied light.

A portion of light generated in a region of the laser tube 15 near a lower wall thereof travels to the end of the optical transmission line 362, and is then propagated to the photodetector 342 through the optical transmission line 362. The photodetector 342 converts the applied light into a corresponding electric signal. The photodetector 342 outputs the electric signal to the comparator 352. The output signal of the photodetector 342 has a voltage depending on the intensity of the applied light.

The intensity of light emitted from a region within the laser tube 15 near its walls varies as discharge in the laser tube 15 is stabilized. Accordingly, the voltage of the output signal of the photodetector 341 represents the degree of stability of discharge in the laser tube 15. In addition, the voltage of the output signal of the photodetector 342 represents the degree of stability of discharge in the laser tube 15.

The comparator 351 compares the voltage of the output signal of the photodetector 341 with a predetermined reference voltage corresponding to the boundary between stable discharge and unstable discharge. Thus, the comparator 351 decides whether discharge in the laser tube 15 is stable or unstable. The comparator 351 outputs a binary signal, the state of which depends the result of the voltage comparison. Accordingly, the output signal of the comparator 351 represents whether discharge in the laser tube 15 is stable or unstable. For example, the output signal of the comparator 351 assumes a low level state and a high level state when discharge is stable and unstable respectively.

The comparator 352 compares the voltage of the output signal of the photodetector 342 with a predetermined reference voltage corresponding to the boundary between stable discharge and unstable discharge. Thus, the comparator 352 decides whether discharge in the laser tube 15 is stable or unstable. The comparator 352 outputs a binary signal, the state of which depends the result of the voltage comparison. Accordingly, the output signal of the comparator 352 represents whether discharge in the laser tube 15 is stable or unstable. For example, the output signal of the comparator 352 assumes a low level state and a high level state when discharge is stable and unstable respectively.

The processor 359 receives the output signals of the comparators 351 and 352, and combines the received signals into a composite signal. The processor 359 outputs the composite signal. The processor 359 can be an OR circuit.

Figure 18:
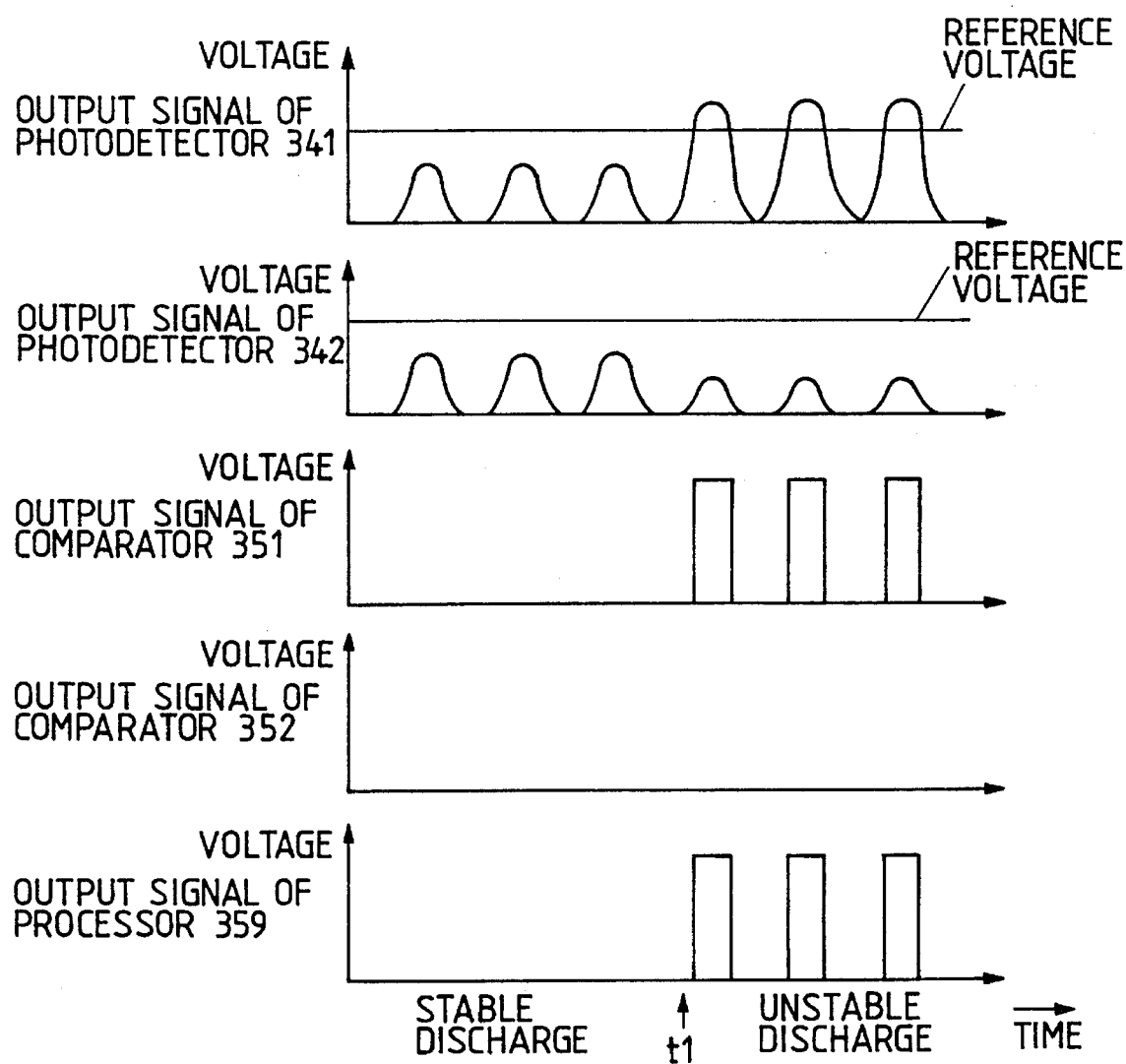
FIG. 18 is a time-domain diagram of signals in the apparatus of FIG. 17.

With reference to FIG. 18, it is now assumed that stable discharge is replaced by unstable discharge in the laser tube 15 at a moment t1. During a period before the moment t1, the voltages of the output signals of the photodetectors 341 and 342 remain lower than the reference voltages so that the output signals of the comparators 351 and 352 remain in the low level states. Therefore, during this period, the output signal of the processor 359 remains in a low level state. During a period after the moment t1, the voltage of the output signal of the photodetector 341 periodically exceeds the reference voltage so that the output signal of the comparator 351 periodically changes between the low level state and the high level state. On the other hand, the voltage of the output signal of the photodetector 342 remains lower than the reference voltage so that the output signal of the comparator 352 remains in the low level state. Therefore, during this period, the output signal of the processor 359 periodically changes between the low level state and a high level state. The changes of the output signal of the processor 359 to the high level state indicate the presence of unstable discharge in the laser tube 15. The output signal of the processor 359 represents the conditions of discharge along the radial direction with respect to the laser tube 15.

Figure 19:
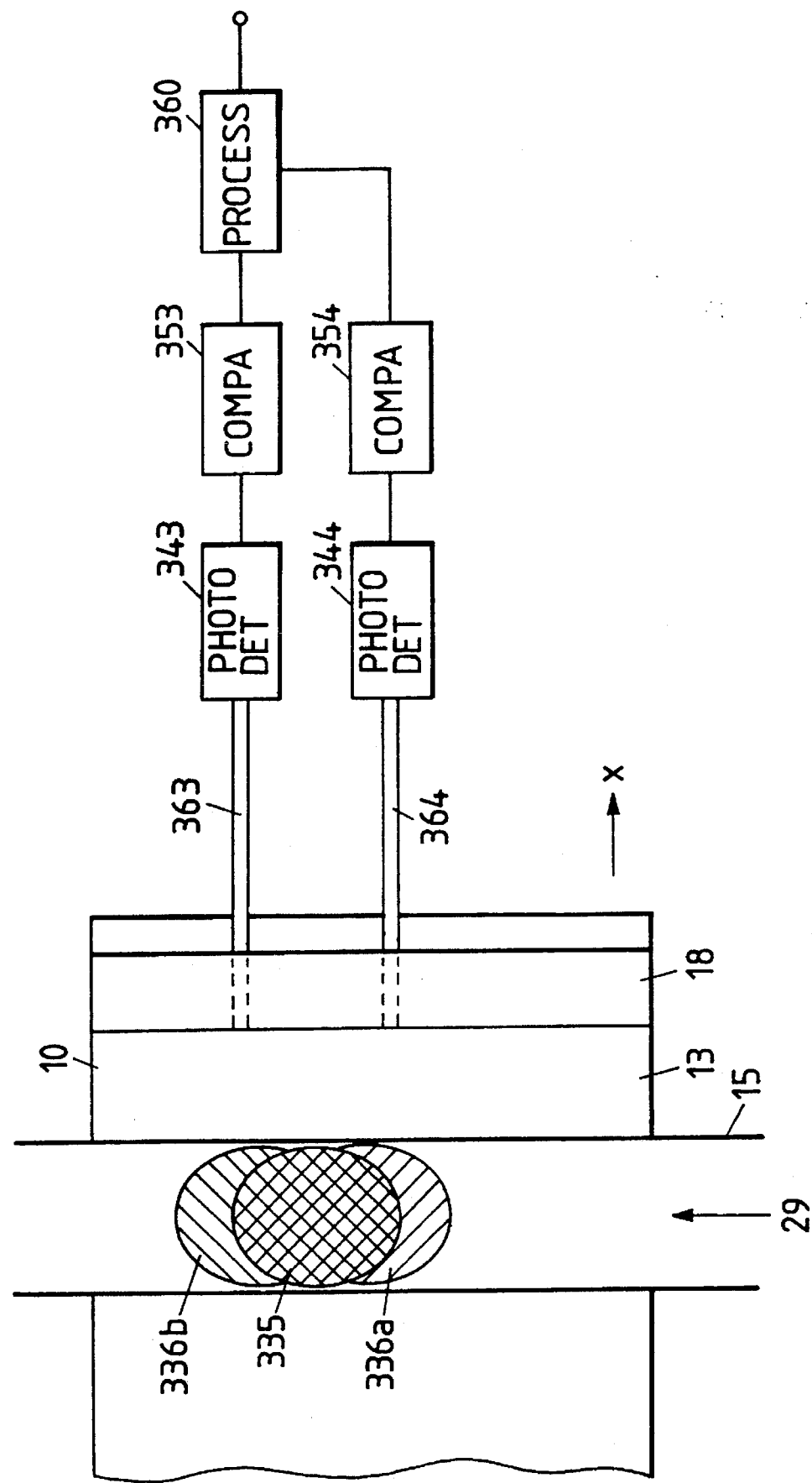
FIG. 19 is a diagram of a part of the apparatus in FIG. 16.

As shown in FIG. 19, the microwave powered gas laser apparatus includes photodetectors 343 and 344 of, for example, the avalanche type which are located outside the resonant cavity 10. The interior of the waveguide 13 is optically connected to the photodiodes 343 and 344 via optical transmission lines 363 and 364 including, for example, optical fiber cables.

The optical transmission lines 363 and 364 extend through the plunger 18 at the end of the waveguide 13. Ends of the optical transmission lines 363 and 364 are exposed at the interior of the waveguide 13 so that they can receive light emitted from the laser tube 15 within the resonant cavity 10. Specifically, the ends of the optical transmission lines 363 and 364 are spaced from each other in the axial direction with respect to the laser tube 15. Laser medium gas 29 flows in an axial direction of the laser tube 15 which is denoted by the arrow in FIG. 19. The end of the optical transmission line 363 is positioned to receive light emitted from a downstream part of the laser tube 15 with respect to the flow of the laser medium gas 29. On the other hand, the end of the optical transmission line 364 is positioned to receive light emitted from an upstream part of the laser tube 15 with respect to the flow of the laser medium gas 29.

The photodetectors 343 and 344 are electrically connected to comparators 353 and 354 respectively. The comparators 353 and 354 are electrically connected to a processor 360.

A portion of light generated in a downstream region of the laser tube 15 travels to the end of the optical transmission line 363, and is then propagated to the photodetector 343 through the optical transmission line 363. The photodetector 343 converts the applied light into a corresponding electric signal. The photodetector 343 outputs the electric signal to the comparator 353. The output signal of the photodetector 343 has a voltage depending on the intensity of the applied light.

A portion of light generated in an upstream region of the laser tube 15 travels to the end of the optical transmission line 364, and is then propagated to the photodetector 344 through the optical transmission line 364. The photodetector 344 converts the applied light into a corresponding electric signal. The photodetector 344 outputs the electric signal to the comparator 354. The output signal of the photodetector 344 has a voltage depending on the intensity of the applied light.

As shown in FIG. 19, the position of unstable discharge 336a or 336b is offset from the position of stable discharge 335 along the axial direction with respect to the laser tube 15. Thus, the intensity of light emitted from a downstream region or an upstream region within the laser tube 15 varies as discharge in the laser tube 15 is stabilized. Accordingly, the voltage of the output signal of the photodetector 343 represents the degree of stability of discharge in the laser tube 15. In addition, the voltage of the output signal of the photodetector 344 represents the degree of stability of discharge in the laser tube 15.

The comparator 353 compares the voltage of the output signal of the photodetector 343 with a predetermined reference voltage corresponding to the boundary between stable discharge and unstable discharge. Thus, the comparator 353 decides whether discharge in the laser tube 15 is stable or unstable. The comparator 353 outputs a binary signal, the state of which depends the result of the voltage comparison. Accordingly, the output signal of the comparator 353 represents whether discharge in the laser tube 15 is stable or unstable. For example, the output signal of the comparator 353 assumes a low level state and a high level state when discharge is stable and unstable respectively.

The comparator 354 compares the voltage of the output signal of the photodetector 344 with a predetermined reference voltage corresponding to the boundary between stable discharge and unstable discharge. Thus, the comparator 354 decides whether discharge in the laser tube 15 is stable or unstable. The comparator 354 outputs a binary signal, the state of which depends the result of the voltage comparison. Accordingly, the output signal of the comparator 354 represents whether discharge in the laser tube 15 is stable or unstable. For example, the output signal of the comparator 354 assumes a low level state and a high level state when discharge is stable and unstable respectively.

The processor 360 receives the output signals of the comparators 353 and 354, and combines the received signals into a composite signal. The processor 360 outputs the composite signal. The processor 360 can be an OR circuit.

Figure 20:
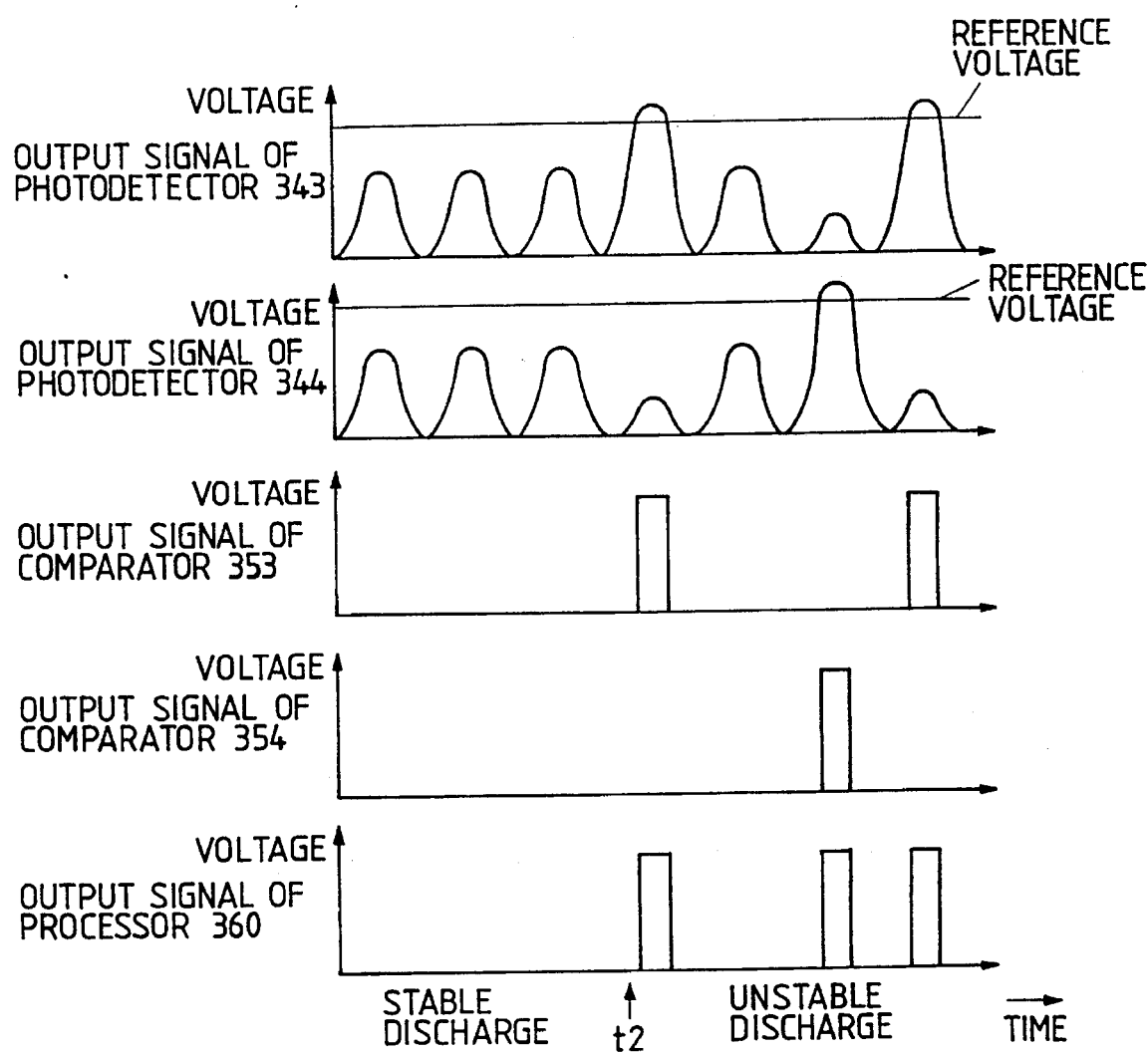
FIG. 20 is a time-domain diagram of signals in the apparatus of FIG. 19.

With reference to FIG. 20, it is now assumed that stable discharge is replaced by unstable discharge in the laser tube 15 at a moment t2. During a period before the moment t2, the voltages of the output signals of the photodetectors 343 and 344 remain lower than the reference voltages so that the output signals of the comparators 353 and 354 remain in the low level states. Therefore, during this period, the output signal of the processor 360 remains in a low level state. During a period after the moment t2, the voltage of the output signal of the photodetector 343 periodically exceeds the reference voltage so that the output signal of the comparator 353 periodically changes between the low level state and the high level state. In addition, the voltage of the output signal of the photodetector 344 periodically exceeds the reference voltage so that the output signal of the comparator 354 periodically changes between the low level state and the high level state. Therefore, during this period, the output signal of the processor 360 periodically changes between the low level state and a high level state. The changes of the output signal of the processor 360 to the high level state indicate the presence of unstable discharge in the laser tube 15. The output signal of the processor 360 represents the conditions of discharge along the axial direction with respect to the laser tube 15.

Ninth Embodiment

A ninth embodiment of this invention is similar to the embodiment of FIGS. 16–20 except for design changes indicated later. With reference to FIG. 21, a microwave powered gas laser apparatus includes a differential amplifier 355 which replaces the comparators 351 and 352 and the processor 359 (see FIG. 17). The output signal of a photodetector 341 is applied to a first input terminal of the differential amplifier 355. The output signal of a photodetector 342 is applied to a second input terminal of the differential amplifier 355.

The differential amplifier 355 responds to the difference in voltage between the output signals of the photodetectors 341 and 342. The differential amplifier 355 outputs a signal which changes among three different states, that is, a positive state, a 0-level state, and a negative state, in response to the difference in voltage between the output signals of the photodetectors 341 and 342. Specifically, the output signal of the differential amplifier 355 assumes the positive state when the voltage of the output signal of the photodetector 341 is appreciably higher than the voltage of the output signal of the photodetector 342. The output signal of the differential amplifier 355 assumes the negative state when the voltage of the output signal of the photodetector 341 is appreciably lower than the voltage of the output signal of the photodetector 342. The output signal of the differential amplifier 355 assumes the 0-level state when the voltage of the output signal of the photodetector 341 is approximately equal to the voltage of the output signal of the photodetector 342.

Generally, there is a greater difference between the voltages of the output signals of the photodetectors 341 and 342 as discharge in a laser tube 15 (see FIG. 17) is unstabilized along a radial direction thereof. Therefore, the output signal of the differential amplifier 355 represents the degree of stability of discharge in the laser tube 15 (see FIG. 17) along the radial direction thereof.

As shown in FIG. 22, the microwave powered gas laser apparatus includes a differential amplifier 356 which replaces the comparators 353 and 354 and the processor 360 (see FIG. 19). The output signal of a photodetector 343 is applied to a first input terminal of the differential amplifier 356. The output signal of a photodetector 344 is applied to a second input terminal of the differential amplifier 356.

The differential amplifier 356 responds to the difference in voltage between the output signals of the photodetectors 343 and 344. The differential amplifier 356 outputs a signal which changes among three different states, that is, a positive state, a 0-level state, and a negative state, in response to the difference in voltage between the output signals of the photodetectors 343 and 344. Specifically, the output signal of the differential amplifier 356 assumes the positive state when the voltage of the output signal of the photodetector 343 is appreciably higher than the voltage of the output signal of the photodetector 344. The output signal of the differential amplifier 356 assumes the negative state when the voltage of the output signal of the photodetector 343 is appreciably lower than the voltage of the output signal of the photodetector 344. The output signal of the differential amplifier 356 assumes the 0-level state when the voltage of the output signal of the photodetector 343 is approximately equal to the voltage of the output signal of the photodetector 344.

Generally, there is a greater difference between the voltages of the output signals of the photodetectors 343 and 344 as discharge in the laser tube 15 (see FIG. 19) is unstabilized along an axial direction thereof. Therefore, the output signal of the differential amplifier 356 represents the degree of stability of discharge in the laser tube 15 (see FIG. 19) along the axial direction thereof.

With reference to FIG. 23, it is now assumed that stable discharge is replaced by unstable discharge in the laser tube 15 at a moment t3. During a period before the moment t3, the voltages of the output signals of the photodetectors 341 and 342 remain approximately equal to each other so that the output signal of the differential amplifier 355 remains in the 0-level state. During a period after the moment t3, the voltage of the output signal of the photodetector 341 periodically increases above and decreases below the voltage of the output signal of the photodetector 342 so that the output signal of the differential amplifier 355 periodically changes between the positive state and the negative state. The changes of the output signal of the differential amplifier 355 to the positive state or the negative state indicate the presence of unstable discharge in the laser tube 15. The output signal of the differential amplifier 355 represents the conditions of discharge along the radial direction with respect to the laser tube 15.

Figure 24:
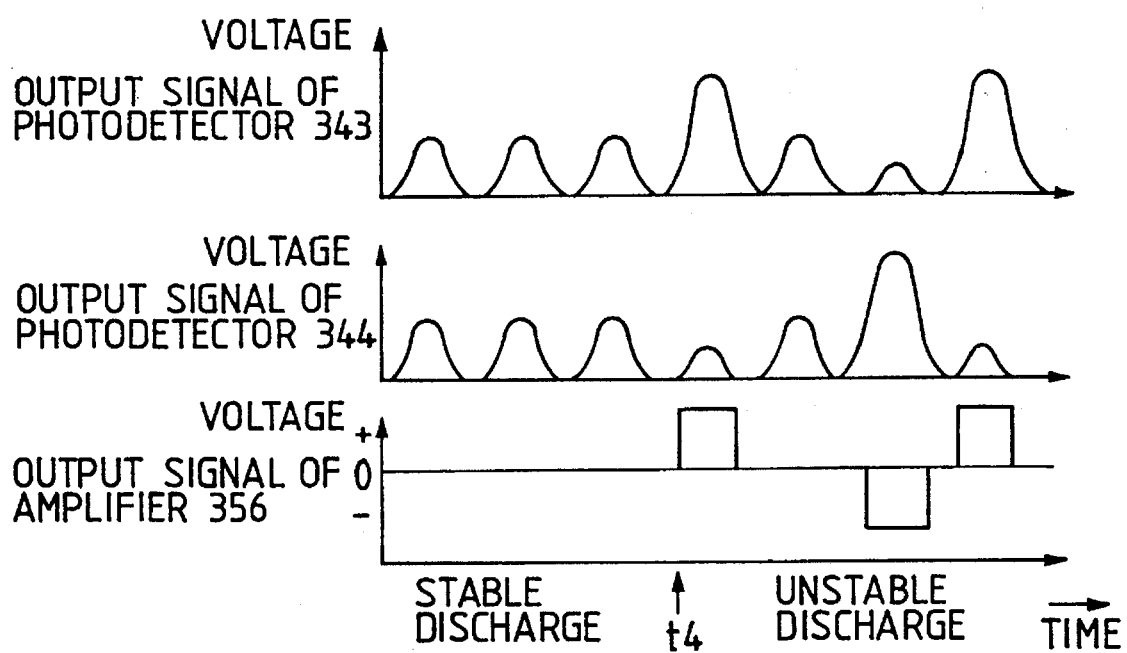
FIG. 24 is a time-domain diagram of signals in the apparatus of FIG. 22.

With reference to FIG. 24, it is now assumed that stable discharge is replaced by unstable discharge in the laser tube 15 at a moment t4. During a period before the moment t4, the voltages of the output signals of the photodetectors 343 and 344 remain approximately equal to each other so that the output signal of the differential amplifier 356 remains in the 0-level state. During a period after the moment t4, the voltage of the output signal of the photodetector 343 periodically increases above and decreases below the voltage of the output signal of the photodetector 344 so that the output signal of the differential amplifier 356 periodically changes between the positive state and the negative state. The changes of the output signal of the differential amplifier 356 to the positive state or the negative state indicate the presence of unstable discharge in the laser tube 15. The output signal of the differential amplifier 356 represents the conditions of discharge along the axial direction with respect to the laser tube 15.

Tenth Embodiment.

Figure 25:
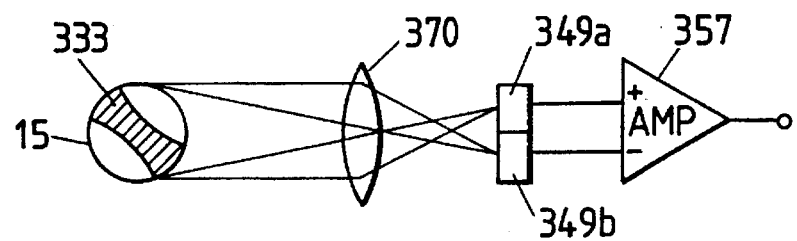
FIG. 25 is a diagram of a part of a microwave powered gas laser apparatus according to a tenth embodiment of this invention.

A tenth embodiment of this invention is similar to the embodiment of FIGS. 16–20 except for design changes indicated later. With reference to FIG. 25, a microwave powered gas laser apparatus includes a projection lens 370, photodetectors 349a and 349b, and a differential amplifier 357.

A portion of light generated in a lower portion of a laser tube 15 is focused on the photodetector 349a by the projection lens 370. A portion of light generated in an upper portion of the laser tube 15 is focused on the photodetector 349b by the projection lens 370.

The photodetector 349a converts the applied light into a corresponding electric signal, the voltage of which depends on the intensity of the applied light. The photodetector 349a outputs the electric signal to a first input terminal of the differential amplifier 357. The photodetector 349b converts the applied light into a corresponding electric signal, the voltage of which depends on the intensity of the applied light. The photodetector 349b outputs the electric signal to a second input terminal of the differential amplifier 357.

The differential amplifier 357 responds to the difference in voltage between the output signals of the photodetectors 349a and 349b. The differential amplifier 357 outputs a signal which changes among three different states, that is, a positive state, a 0-level state, and a negative state, in response to the difference in voltage between the output signals of the photodetectors 349a and 349b.

Figure 26:
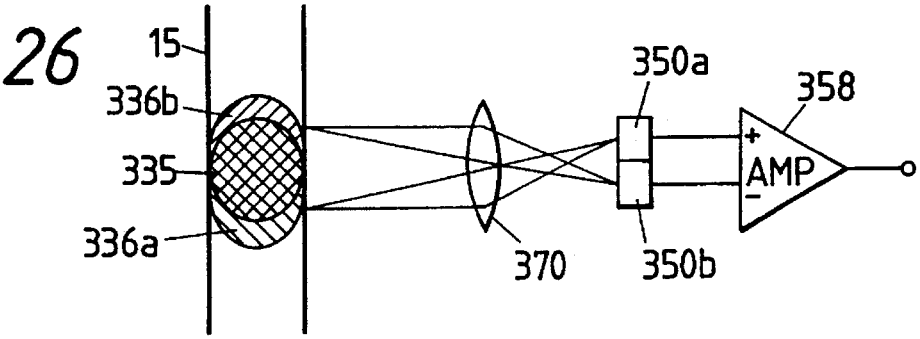
FIG. 26 is a diagram of another part of the apparatus according to the tenth embodiment.

As shown in FIG. 26, the microwave powered gas laser apparatus includes photodetectors 350a and 350b, and a differential amplifier 358.

A portion of light generated in an upstream portion of the laser tube 15 is focused on the photodetector 350a by the projection lens 370. A portion of light generated in a downstream portion of the laser tube 15 is focused on the photodetector 350b by the projection lens 370.

The photodetector 350a converts the applied light into a corresponding electric signal, the voltage of which depends on the intensity of the applied light. The photodetector 350a outputs the electric signal to a first input terminal of the differential amplifier 358. The photodetector 350b converts the applied light into a corresponding electric signal, the voltage of which depends on the intensity of the applied light. The photodetector 350b outputs the electric signal to a second input terminal of the differential amplifier 358.

The differential amplifier 358 responds to the difference in voltage between the output signals of the photodetectors 350a and 350b. The differential amplifier 358 outputs a signal which changes among three different states, that is, a positive state, a 0-level state, and a negative state, in response to the difference in voltage between the output signals of the photodetectors 350a and 350b.

Figure 27:
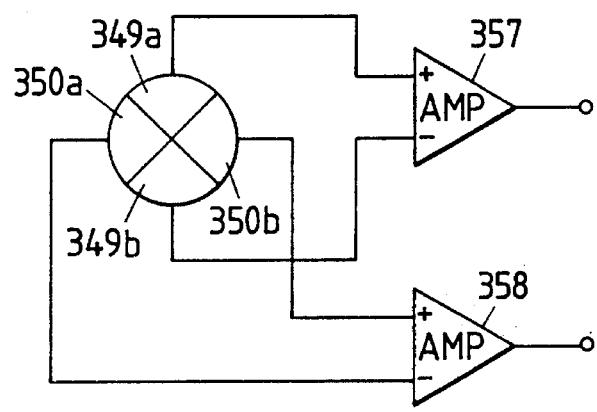
FIG. 27 is a diagram of photodetectors and differential amplifiers in the apparatus of FIGS. 25 and 26.

As shown in FIG. 27, the photodetectors 349a, 349b, 350a, and 350b are provided in a single photodetector unit. The photodetector unit has a circular configuration. The photodetector unit is divided into four quarter segments corresponding to the photodetectors 349a, 349b, 350a, and 350b respectively.

The microwave powered gas laser apparatus in this embodiment operates similarly to the microwave powered gas laser apparatus in the embodiment of FIGS. 21–24.

It should be noted that the differential amplifier 357 may be replaced by comparators and a processor as in the embodiment of FIGS. 16–20. In addition, the differential amplifier 358 may be replaced by comparators and a processor as in the embodiment of FIGS. 16–20.

Eleventh Embodiment

Figure 28:
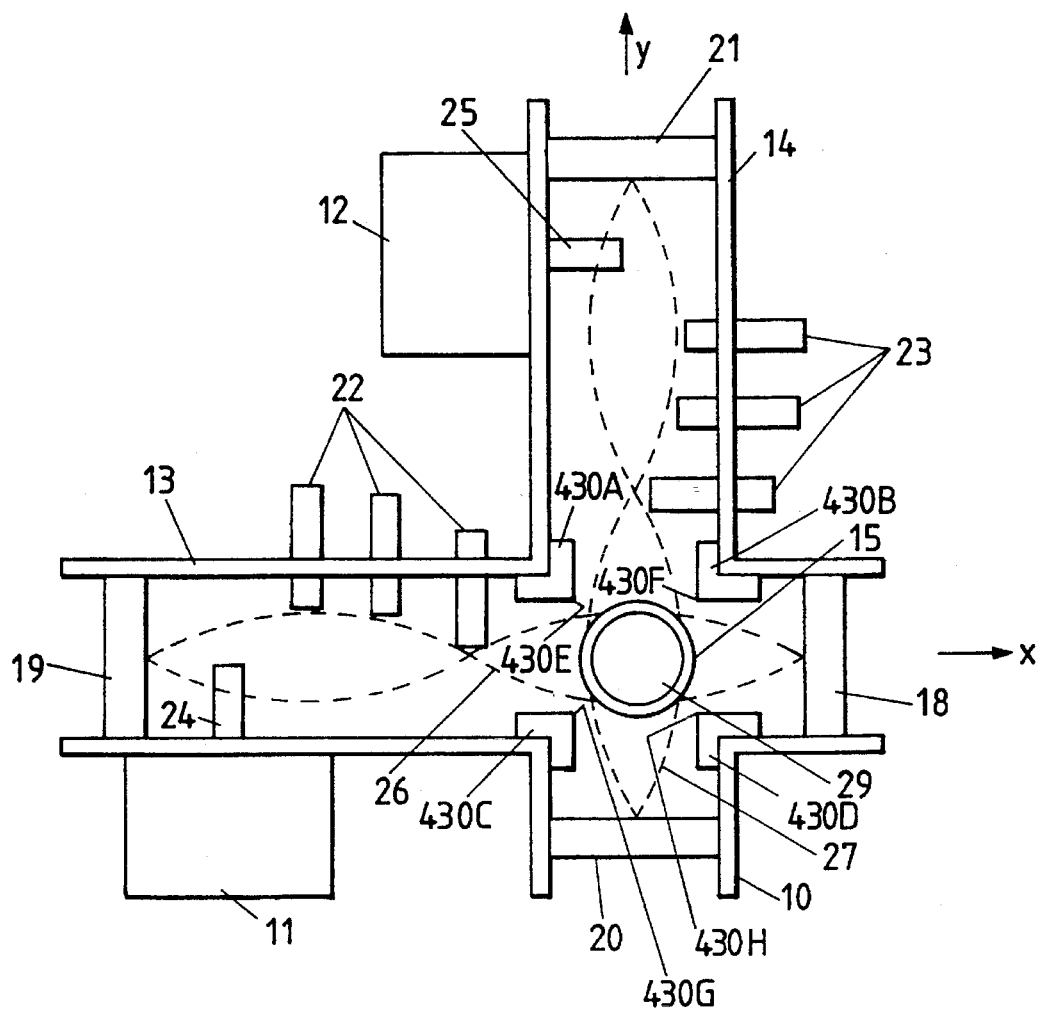
FIG. 28 is a sectional view of a microwave powered gas laser apparatus according to an eleventh embodiment of this invention.

FIG. 28 shows an eleventh embodiment of this invention which is similar to the embodiment of FIGS. 1 and 2 except for an additional arrangement indicated later. With reference to FIG. 28, a microwave powered gas laser apparatus includes electrically conductive members 430A, 430B, 430C, and 430D disposed within a resonant cavity 10.

The electrically conductive members 430A, 430B, 430C, and 430D are spaced around a laser tube 15 at equal angular intervals. The electrically conductive members 430A, 430B, 430C, and 430D are arranged in a symmetrical arrangement with respect to the laser tube 15. Each of the electrically conductive members 430A, 430B, 430C, and 430D is electrically and mechanically connected to both a wall of a waveguide 13 and a wall of a waveguide 14 in region where the walls of the waveguides 13 and 14 meet. Therefore, potentials at the electrically conductive members 430A, 430B, 430C, and 430D are equal to potentials at the walls of the waveguides 13 and 14.

Figure 29:
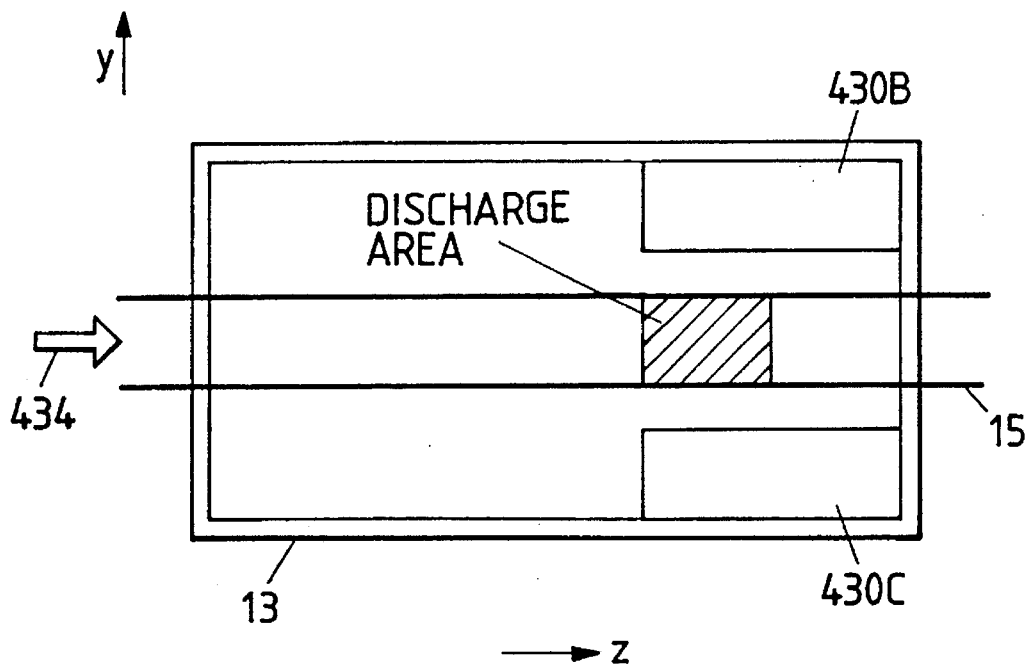
FIG. 29 is a sectional view of a waveguide, electrically conductive members, and a laser tube in the apparatus of FIG. 28.

With reference to FIGS. 28 and 29, the laser tube 15 defines a part of a closed loop passage for gas circulation. Laser medium gas 29 is circulated in the closed loop passage by a fan (not shown). The laser medium gas 29 flows through the laser tube 15 along a direction denoted by the arrow 434 in FIG. 29.

The electrically conductive members 430A, 430B, 430C, and 430D extend axially with respect to the laser tube 15 in a downstream region around the laser tube 15. The electrically conductive members 430A, 430B, 430C, and 430D are spaced from outer walls of the laser tube 15.

Figure 30:
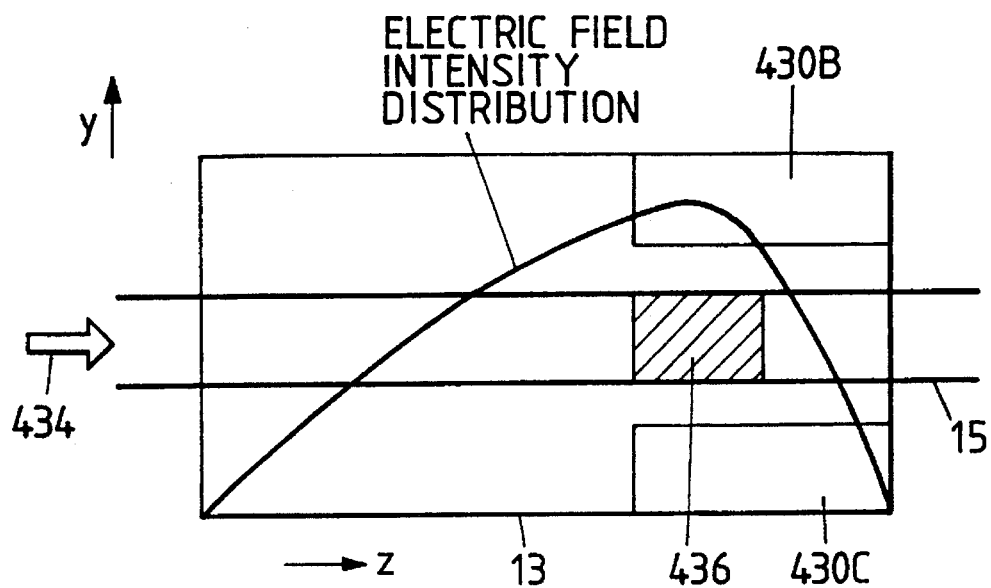
FIG. 30 is a sectional view of the electrically conductive members and the laser tube in the apparatus of FIG. 28 which includes an illustration of a distribution of the intensity of a z-direction electric field.

The electrically conductive members 430A, 430B, 430C, and 430D affect a distribution or a variation of the intensity of an electric field in the laser tube 15 along a "z" direction (that is, the axial direction). Specifically, as shown in FIG. 30, the intensity of the z-direction electric field peaks at a position directly opposing upstream portions of the electrically conductive members 430A, 430B, 430C, and 430D. The intensity of the z-direction electric field at a point within the laser tube 15 drops from the peak level at a relatively great rate as the point moves in the downstream direction (the "z" direction). On the other hand, the intensity of the z-direction electric field at a point within the laser tube 15 increases toward the peak level at a relatively small rate as the point moves in the downstream direction (the "z" direction). Thus, the rate of the drop of the electric field intensity from the peak level is remarkably greater than the rate of the increase of the electric field intensity toward the peak level. In this way, the electrically conductive members 430A, 430B, 430C, and 430D provide the distribution of the electric field intensity which is skewed toward a downstream side.

Discharge tends to occur at the position of the peak of the intensity of the z-direction electric field. In addition, the discharge tends to be moved in the downstream direction (the "z" direction) by the flow of the laser medium gas 29. According to the previously-indicated skewed distribution of the intensity of the z-direction electric field, the intensity of the z-direction electric field to the discharge abruptly drops as the discharge move from the field-peak position in the downstream direction (the "z" direction). Thus, the old discharge which has moved from the field-peak position is prevented from hindering the occurrence of new discharge at the field-peak position. Therefore, on the time average, discharge 436 (see FIG. 30) is stably held in a region at and around the position of the peak of the electric field intensity.

In addition, the electrically conductive members 430A, 430B, 430C, and 430D serve to improve a distribution or a variation of the intensity of an electric field in the laser tube 15 along a radial direction with respect to the laser tube 15.

Generally, in the case of a laser tube having dielectric walls, electric fields tend to focus in the walls so that discharge tends to concentrate on a region adjoining the walls. Such concentration of discharge toward the walls is a negative factor against the attainment of a high laser light output power. As shown in FIG. 28, the electrically conductive members 430A, 430B, 430C, and 430D have corners (edges) 430E, 430F, 430G, and 430H facing or opposing the laser tube 15. Lines of electric flux concentrate on the corners 430E, 430F, 430G, and 430H so that strong electric fields are induced at positions with in the laser tube 15 which radially oppose the corners 430E, 430F, 430G, and 430H respectively. The induced strong electric fields at the angularly spaced positions suppress the concentration of discharge toward the walls of the laser tube 15. This is advantageous in attaining a high laser light output power.

Experiments were carried out as follows. The inside dimension of the waveguide 13 in the "z" direction was equal to 95 mm. The inside dimension of the waveguide 13 in the "y" direction was equal to 45 mm. The electrically conductive members 430A, 430B, 430C, and 430D were made of aluminum. The longitudinal length (the dimension along the "z" direction) of the electrically conductive members 430A, 430B, 430C, and 430D was equal to 40 mm. The thickness (the dimension along the "y" direction) of the electrically conductive members 430A, 430B, 430C, and 430D was equal to 10 mm. The inside diameter of the laser tube 15 was equal to 25 mm. The outside diameter of the laser tube 15 was equal to 28 mm. The laser medium gas 29 flowed at a velocity of about 300 m/s.

The laser medium gas 29 was excited by microwaves through a discharge process to provide laser oscillation. In the absence of the electrically conductive members 430A, 430B, 430C, and 430D, the laser light output power was saturated when the microwave input power increased to 1,070 W. At the saturation point, the laser light output power was equal to 205 W, and the laser oscillation efficiency was equal to 19.2%. In the presence of the electrically conductive members 430A, 430B, 430C, and 430D, the laser light output power was saturated when the microwave input power increased to 1,445 W. At the saturation point, the laser light output power was equal to 273 W, and the laser oscillation efficiency was equal to 18.9%. Thus, the electrically conductive members 430A, 430B, 430C, and 430D increased the maximum level of the laser light output power.

It should be noted that the electrically conductive members 430A, 430B, 430C, and 430D may be arranged out of the symmetrical arrangement.

There may be provided only a single electrically conductive member. In addition, two, three, five, or more electrically conductive members may be provided.

Twelfth Embodiment

Figure 31:
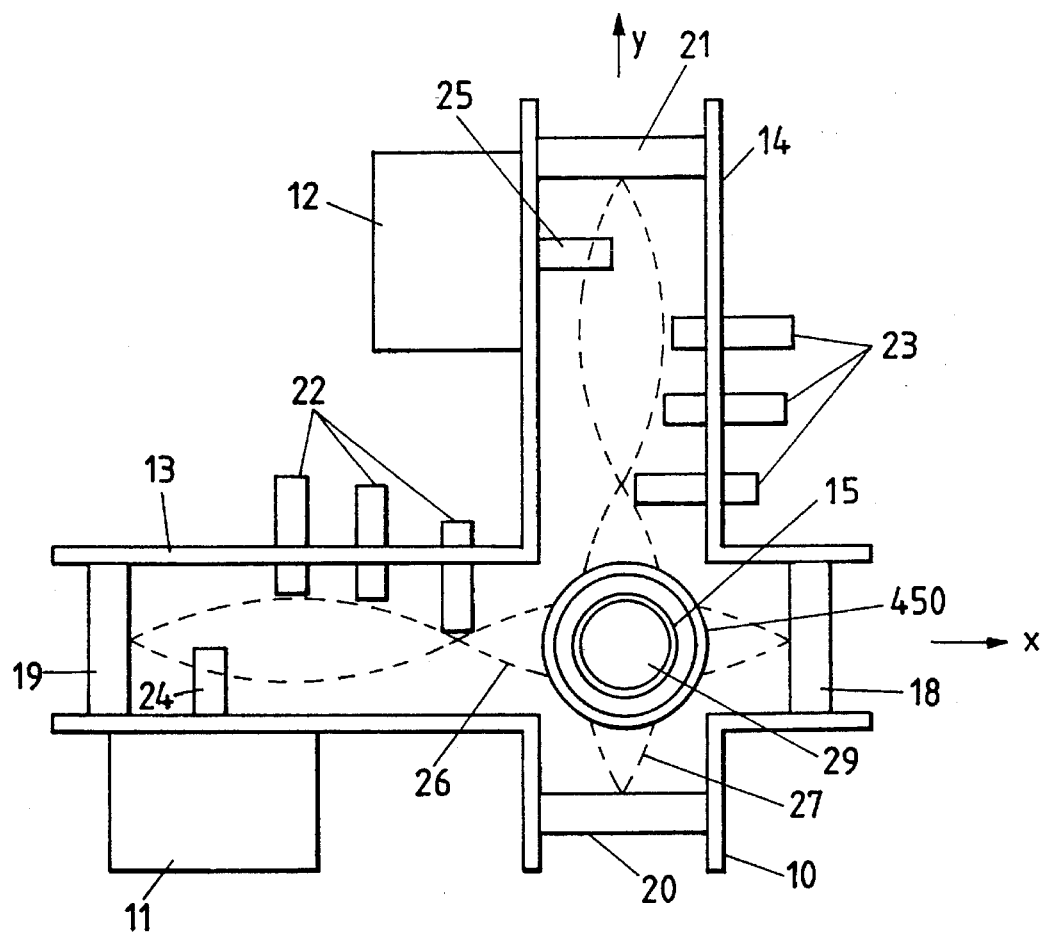
FIG. 31 is a sectional view of a microwave powered gas laser apparatus according to a twelfth embodiment of this invention.
Figure 32:
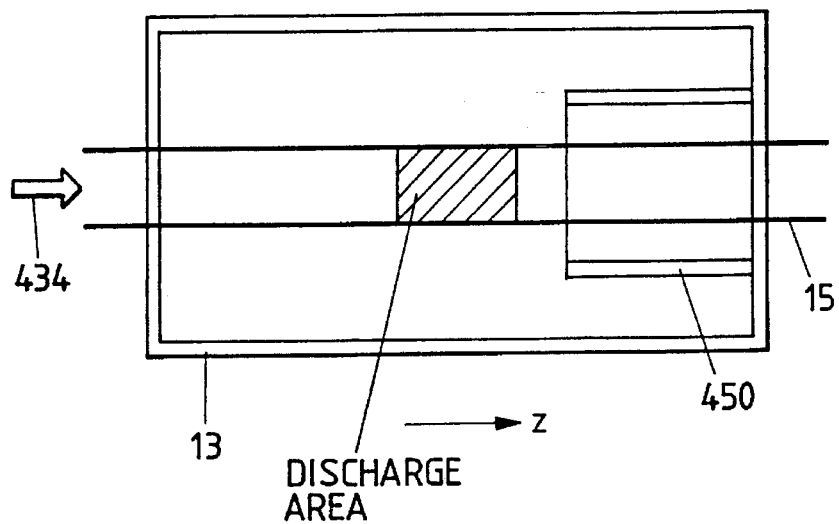
FIG. 32 is a sectional view of a waveguide, an electrically conductive member, and a laser tube in the apparatus of FIG. 31.

FIGS. 31 and 32 show a twelfth embodiment of this invention which is similar to the embodiment of FIGS. 28–30 except for a design change indicated later. With reference to FIGS. 31 and 32, a microwave powered gas laser apparatus includes an electrically conductive member 450 within a resonant cavity 10. The electrically conductive member 450 replaces the electrically conductive members 430A, 430B, 430C, and 430D (see FIGS. 28 and 29).

The electrically conductive member 450 includes a cylinder concentrically arranged around a downstream part of a laser tube 15. One end of the cylinder 450 is electrically and mechanically connected to side walls of a waveguide 13. The inner surfaces of the cylinder 450 are spaced from the outer surfaces of the laser tube 15 by an annular gap.

The Inside diameter of the cylinder 450 is set smaller than the cut-off length with respect to microwaves. Accordingly, the microwaves are prevented from entering the cylinder 450, and the intensity of a z-direction electric field remains substantially null in a region within the cylinder 450. Thus, the cylinder (the electrically conductive member) 450 provides a skewed distribution of the intensity of the z-direction electric field as the electrically conductive members 430A, 430B, 430C, and 430D do.

Experiments were carried out as follows. The inside dimension of the waveguide 13 in the "z" direction was equal to 95 mm. The inside dimension of the waveguide 13 in the "y" direction was equal to 45 mm. The electrically conductive member 450 was made of aluminum. The axial length (the dimension along the "z" direction) of the electrically conductive member 450 was equal to 30 mm. The inside diameter of the electrically conductive member 450 was equal to 30 mm. The inside diameter of the laser tube 15 was equal to 25 mm. The outside diameter of the laser tube 15 was equal to 28 mm. Laser medium gas 29 flowed at a velocity of about 300 m/s.

The laser medium gas 29 was excited by microwaves through a discharge process to provide laser oscillation. In the absence of the electrically conductive member 450, the laser light output power was saturated when the microwave input power increased to 1,070 W. At the saturation point, the laser light output power was equal to 205 W, and the laser oscillation efficiency was equal to 19.2%. In the presence of the electrically conductive member 450, the laser light output power was saturated when the microwave input power increased to 1,282 W. At the saturation point, the laser light output power was equal to 242 W, and the laser oscillation efficiency was equal to 18.9%. Thus, the electrically conductive member 450 increased the maximum level of the laser light output power.

It should be noted that the electrically conductive member 450 may include a rectangular tube or a cylinder at least partially tapered. The electrically conductive member 450 may be arranged around an upstream part of the laser tube 15.

What is claimed is:

1. A microwave powered gas laser apparatus comprising:
   a gas medium; and
   means for exciting the gas medium to a high energy state by a plurality of microwaves being simultaneously present, said exciting means including,
   means for causing the plurality of microwaves to be propagated to the gas medium along respective directions different from each other, so that the plurality of microwaves cross each other at a place occupied by the gas medium to provide spatially even excitation of the gas medium.

2. The microwave powered gas laser apparatus of claim 1, further comprising means for making the microwaves into standing waves respectively, and means for exposing the gas medium to antinodes of electric fields of the standing waves.

3. The microwave powered gas laser apparatus of claim 2, wherein the means for making the microwaves into the standing waves comprises a resonant cavity, the resonant cavity comprising waveguides intersecting with each other at an intersection place, the gas medium being positioned in the intersection place.

4. The microwave powered gas laser apparatus of claim 3, further comprising means for causing the waveguides to intersect with each other at a right angle.

5. The microwave powered gas laser apparatus of claim 4, further comprising microwave generators radiating the microwaves into the waveguides respectively.

6. The microwave powered gas laser apparatus of claim 5, further comprising means for causing the waveguides to be provided with matching devices respectively.

7. The microwave powered gas laser apparatus of claim 3, further comprising means for causing the resonant cavity to have a rectangular parallelepiped shape.

8. The microwave powered gas laser apparatus of claim 7, further comprising microwave generators producing the microwaves, the microwave generators being provided on adjacent surfaces of the resonant cavity respectively.

9. The microwave powered gas laser apparatus of claim 8, further comprising matching devices for adjusting standing waves of the microwaves respectively, the matching devices being provided on adjacent surfaces of the resonant cavity respectively.

10. The microwave powered gas laser apparatus of claim 3, further comprising means for causing the resonant cavity to have a cylindrical shape.

11. The microwave powered gas laser apparatus of claim 10, further comprising microwave generators producing the microwaves and being provided on the resonant cavity.

12. The microwave powered gas laser apparatus of claim 11, further comprising matching devices for adjusting standing waves of the microwaves respectively, the matching devices being provided on the resonant cavity.

13. The microwave powered gas laser apparatus of claim 3, further comprising a laser tube containing the gas medium, and antennas located in the resonant cavity for emitting the microwaves.

14. The microwave powered gas laser apparatus of claim 2, further comprising a single microwave generator producing original microwave, and means for deriving the microwaves from the original microwave.

15. The microwave powered gas laser apparatus of claim 14, wherein the means for making the microwaves into the standing waves comprises a resonant cavity, the resonant cavity comprising waveguides intersecting with each other at an intersection place, the gas medium being positioned in the intersection place, and further comprising a single microwave generator producing original microwave, and means for deriving the microwaves from the original microwave.

16. The microwave powered gas laser apparatus of claim 15, wherein the means for deriving the microwaves from the original microwave comprises means for dividing the original microwave into the microwaves.

17. The microwave powered gas laser apparatus of claim 16, further comprising a single microwave generator producing original microwave, a microwave divider separating the original microwave into microwaves, and waveguides transmitting the microwaves from the microwave divider to the gas medium.

18. The microwave powered gas laser apparatus of claim 17, further comprising means for causing the waveguides to be provided with matching devices for adjusting standing waves of the microwaves respectively.

19. The microwave powered gas laser apparatus of claim 14, further comprising means for circulating the original microwave in a microwave-propagation loop path and applying the microwaves to the gas medium.

20. The microwave powered gas laser apparatus of claim 19, further comprising means for causing the waveguides to be provided with matching devices for adjusting standing waves of the microwaves respectively.

21. The microwave powered gas laser apparatus of claim 14, wherein frequencies of the microwaves are equal to each other, and a temporal phase difference between the microwaves is in a range of 90 degrees ±4.5 degrees.

22. The microwave powered gas laser apparatus of claim 21, wherein a difference between distances of propagation of the microwaves from the microwave generator to the gas medium is equal to a wavelength of the microwaves which is multiplied by a value of ($\frac{1}{4}$+N/2), where N denotes an integer equal to or greater than 0.

23. The microwave powered gas laser apparatus of claim 22, wherein the difference between the distances of propagation of the microwaves from the microwave generator to the gas medium is in a range of ±5% around the value of ($\frac{1}{4}$+N/2).

24. The microwave powered gas laser apparatus of claim 21, further comprising a phase shifter provided in one of paths of propagation of the microwaves from the microwave generator to the gas medium.

25. The microwave powered gas laser apparatus of claim 1, further comprising means for causing the microwaves to comprise pulse microwaves.

26. The microwave powered gas laser apparatus of claim 25, further comprising means for causing the pulse microwaves to have a frequency of 20 kHz or higher.

27. The microwave powered gas laser apparatus of claim 25, further comprising means for causing the gas medium to emit pulse laser light.

28. The microwave powered gas laser apparatus of claim 25, further comprising means for synchronizing the pulse microwaves.

29. The microwave powered gas laser apparatus of claim 25, further comprising means for causing the pulse microwaves to have a duty cycle in a range of 0.1 to 0.3.

30. The microwave powered gas laser apparatus of claim 25, further comprising means for synchronizing leading edges of the pulse microwaves.

31. The microwave powered gas laser apparatus of claim 1, wherein said means for causing the directions of vibrations of the electric fields of the microwaves to be different from each other includes, means for causing the directions of vibrations of the electric fields of the microwaves to be perpendicular to each other.

32. The microwave powered gas laser apparatus of claim 31, further comprising a laser tube containing the gas medium, and wherein said means for causing the directions of vibrations of the electric fields of the microwaves to be perpendicular to each other comprises, means for causing at least one of the directions of vibrations of the electric fields of the microwaves to be perpendicular to an optical axis of the laser tube.

33. The microwave powered gas laser apparatus of claim 1, further comprising means for causing frequencies of the microwaves to be different from each other.

34. The microwave powered gas laser apparatus of claim 33, further comprising means for causing a difference between the frequencies of the microwaves to be equal to 0.1 GHz or less.

35. The microwave powered gas laser apparatus of claim 1, further comprising means for adjusting positional conditions of standing waves of the microwaves.

36. The microwave powered gas laser apparatus of claim 35, wherein the means for adjusting the positional conditions of the standing waves of the microwaves comprises movable plungers having apertures, and means for causing the positional conditions of the standing waves to depend on positions of the movable plungers.

37. The microwave powered gas laser apparatus of claim 1, wherein the microwaves have frequencies in a range of 2.45 GHz ±0.05 GHz.

38. The microwave powered gas laser apparatus of claim 1, further comprising magnetrons producing the microwaves respectively, means for feeding currents to the magnetrons respectively, and means for compensating a difference between the currents.

39. The microwave powered gas laser apparatus of claim 38, wherein the means for compensating the difference between the currents comprises windings which generate magnetic fields canceling each other, and means for enabling the currents to flow through the windings respectively.

40. The microwave powered gas laser apparatus of claim 38, further comprising a core providing with the windings.

41. The microwave powered gas laser apparatus of claim 1, further comprising means for detecting light beams emitted from regions in the gas medium respectively to monitor discharge conditions of the gas medium.

42. The microwave powered gas laser apparatus of claim 41, wherein the means for detecting the light beams comprises photodetectors subjected to the light beams respectively, comparators comparing output signals of the photodetectors with predetermined reference signals, and means for combining output signals of the comparators into a composite signal representing the discharge conditions of the gas medium.

43. The microwave powered gas laser apparatus of claim 42, wherein the predetermined reference signals correspond to a boundary between a stable discharge condition and an unstable discharge condition.

44. The microwave powered gas laser apparatus of claim 41, wherein the means for detecting the light beams comprises photodetectors subjected to the light beams respectively, and means for generating a difference signal which depends on a difference between output signals of the photodetectors, the difference signal representing the discharge conditions of the gas medium.

45. The microwave powered gas laser apparatus of claim 41, further comprising a cylindrical laser tube containing the gas medium, and wherein the regions are separated from each other in at least one of a diametrical direction and an axial direction with respect to the cylindrical laser tube.

46. The microwave powered gas laser apparatus of claim 45, wherein the means for detecting the light beams comprises photodetectors subjected to the light beams respectively, the photodetectors including photodiodes provided in a single unit.

47. The microwave powered gas laser apparatus of claim 41, further comprising means for detecting arc conditions of the gas medium in response to the detected light beams.

48. The microwave powered gas laser apparatus of claim 41, wherein the means for detecting the light beams comprises photodetectors, and optical transmission lines guiding the light beams to the photodetectors respectively.

49. The microwave powered gas laser apparatus of claim 48, further comprising a cylindrical laser tube containing the gas medium, and wherein ends of the optical transmission lines closer to the gas medium are spaced from each other in a diametrical direction with respect to the cylindrical laser tube.

50. The microwave powered gas laser apparatus of claim 46, further comprising a cylindrical laser tube containing the gas medium, and wherein ends of the optical transmission lines closer to the gas medium are spaced from each other in an axial direction with respect to the cylindrical laser tube.

51. The microwave powered gas laser apparatus of claim 48, wherein the optical transmission lines comprise a projection lens.

52. The microwave powered gas laser apparatus of claim 48, wherein the optical transmission lines comprise optical fiber cables.

53. The microwave powered gas laser apparatus of claim 1, further comprising means for controlling a distribution of intensity of the electric field of at least one of the microwaves.

54. The microwave powered gas laser apparatus of claim 53, further comprising a laser tube containing the gas medium, and means for driving the gas medium to flow through the laser tube, and wherein a rate of a variation in the intensity of the electric field in a downstream portion of the laser tube is greater than a rate of a variation in the intensity of the electric field in an upstream portion of the laser tube.

55. The microwave powered gas laser apparatus of claim 53, further comprising a laser tube containing the gas medium, and means for driving the gas medium to flow through the laser tube, and wherein a peak of the intensity of the electric field is located in a downstream half of the laser tube.

56. The microwave powered gas laser apparatus of claim 53, wherein the means for controlling the distribution comprises an electrically conductive member.

57. The microwave powered gas laser apparatus of claim 53, wherein the means for controlling the distribution comprises a plurality of electrically conductive members, and means for substantially equalizing potentials at the electrically conductive members.

58. The microwave powered gas laser apparatus of claim 53, wherein the means for controlling the distribution comprises means for cutting off a portion of the electric field in the gas medium.

59. The microwave powered gas laser apparatus of claim 58, further comprising a laser tube containing the gas medium, and wherein the means for controlling the distribution comprises an electrical conductive member surrounding a part of the laser tube.

60. The microwave powered gas laser apparatus of claim 53, further comprising a laser tube containing the gas medium, waveguides transmitting the microwaves to the gas medium and intersecting with each other at an intersection place containing the laser tube, and wherein the means for controlling the distribution comprises means for controlling a distribution of intensity of the electric field of at least one of the microwaves along a radial direction with respect to the laser tube.

61. The microwave powered gas laser apparatus of claim 60, wherein the means for controlling the distribution comprises an electrically conductive member.

62. The microwave powered gas laser apparatus of claim 61, wherein the means for controlling the distribution comprises a plurality of electrically conductive members, and means for substantially equalizing potentials at the electrically conductive members.

63. The microwave powered gas laser apparatus of claim 1, wherein the gas medium comprises $CO_2$ gas.

* * * * *